Figure 1:
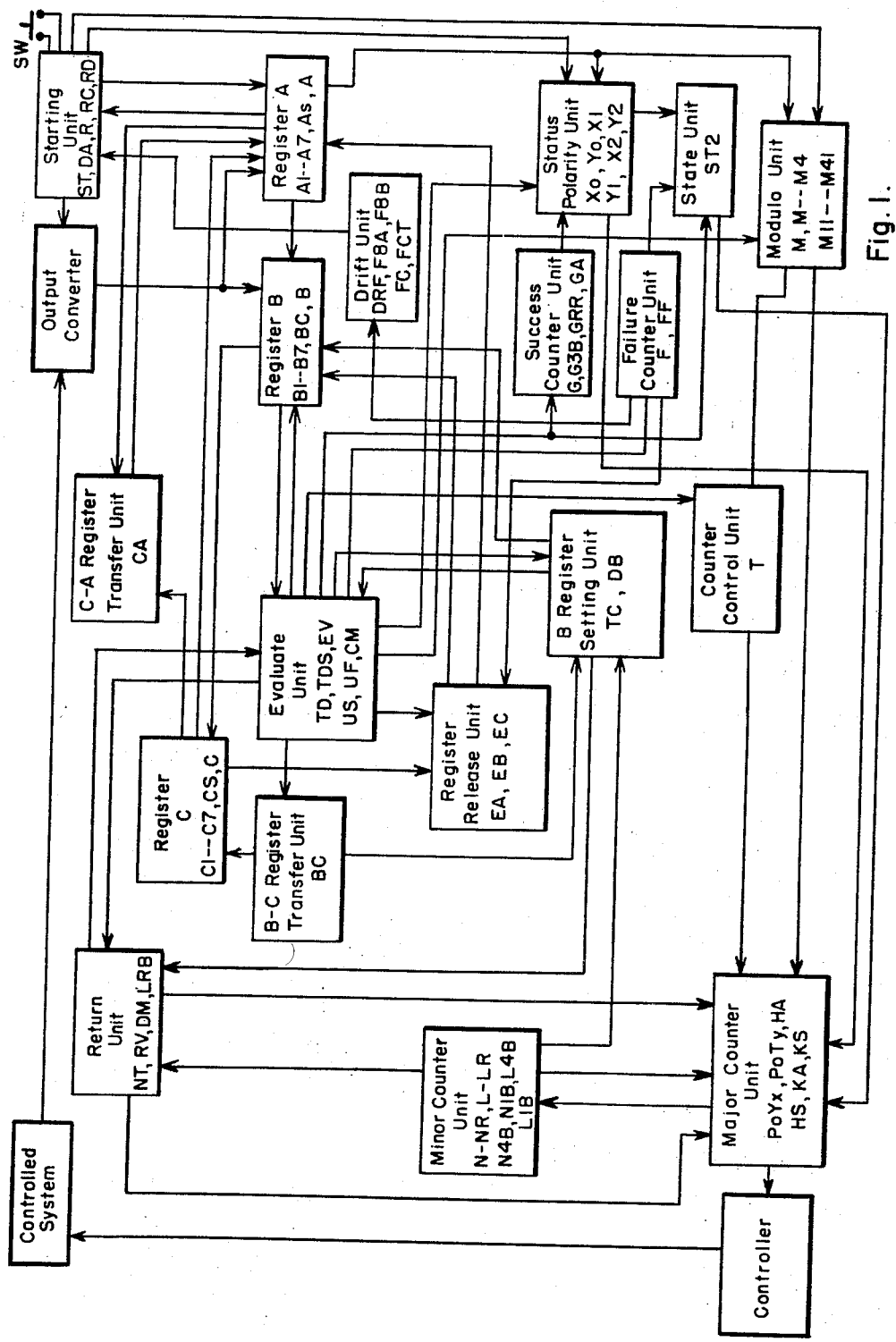

United States Patent Office 3,044,701
Patented July 17, 1962

3,044,701
METHOD AND APPARATUS FOR OPTIMALIZING THE OPERATION OF A SYSTEM
Albert Kerstukos, Robert Hooke, and Richard C. Bollinger, Pittsburgh, Pa., assignors to Westinghouse Electric Corporation, East Pittsburgh, Pa., a corporation of Pennsylvania
Filed Apr. 24, 1958, Ser. No. 730,590
25 Claims. (Cl. 235—151)

This invention relates to the automation art and has particular relationship to the control of the components used in an industrial system or of the environmental conditions, such as temperature and pressure under which the system is operating. Such components and conditions are called herein the parameters affecting the system.

The invention concerns itself with any industrial system, the operation of which is dependent on a plurality of variable parameters. For example, the invention may be applied to the production of mono-styrene from ethyl-benzene by mixing steam with the ethyl-benzene and maintaining the temperature at a predetermined point. In this case, the variable parameters are the flow rate of the ethyl-benzene, the flow rate of the steam and the temperature. The quality of the product derived from this process is determined by measuring the refractive index of the resulting mono-styrene, which is a liquid. This index may be measured electrically, that is, an electrical magnitude, a potential for example, proportional to the index may be derived. While there are many other industrial systems to which this invention is applicable, the above example is typical, and in the following discussion this example will be referred to. It is not intended that such reference should in any way limit the scope of this invention.

It is broadly an object of this invention to provide methods and apparatus for changing automatically the variable parameters affecting an industrial system in such a way that the operation of the system is optimalized and is maintained in its optimal condition.

It is another object of this invention to provide a method for setting automatically certain or all of the variable parameters affecting the operation of a system at settings such that the operation is at an optimum, and it is a further object of this invention to provide apparatus particularly suitable for practicing this method.

It is a further object of this invention to provide a method for optimalizing the operation of an industrial system by varying the critical variable parameters on which the operation is dependent, and it is still another object of this invention to provide apparatus particularly suitable for practicing this method.

Another object of this invention is to provide a method for continuously evaluating the operation of an industrial system as the critical variable parameters affecting the operation of a system are varied, and it is a further object of this invention to provide apparatus particularly suitable for practicing this method.

A specific object of this invention is to provide a novel method of recording a magnitude measuring the operation of a system as the parameters which affect the operation are varied so that effective evaluation may be carried out, and it is another specific object of this invention to provide apparatus particularly suitable for practicing this method.

An incidental object of this invention is to provide novel memory recording or registering apparatus.

Another incidental object of this invention is to provide novel apparatus for evaluating the operation of a system.

An ancillary object of this invention is to provide novel apparatus for measuring out increments of different length.

A still further ancillary object of this invention is to provide for apparatus in which the operation of a system is controlled by changing variable parameters in accordance with a predetermined pattern, memory apparatus for identifying the point in the pattern at which the apparatus is operating at any time.

In accordance with this invention the operation of an industrial system is optimalized by varying critical or selected parameters of the system in increments in accordance with a predetermined pattern, comparing the operation of the system after each setting of the parameters with the highest operation obtained during prior settings and adjusting the polarity or the magnitude (or both) of the succeeding parameters in accordance with the results of the comparison.

The application of the invention may be understood by considering the above-mentioned system for producing styrene. Let the temperature be identified by the variable $X$, the flow rate of the ethyl-benzene by the variable $Y$ and the flow rate of the steam by the variable $Z$. The increments of each of these variables which are added are identified as $\Delta X$, $\Delta Y$, $\Delta Z$. It may be assumed that initially the system is set at a point at which the variables have values $X_i$, $Y_i$, $Z_i$ and that values of the parameters at optimum operation are $X_o$, $Y_o$, $Z_o$. In accordance with this invention, the operation of the system is optimalized by adding combinations of the increments $\Delta X$, $\Delta Y$, $\Delta Z$, in accordance with the predetermined pattern which is repeated and evalcuating the operation after each setting until the setting $X_o$, $Y_o$, $Z_o$ is achieved. Following each evaluation the magnitude and/or the polarity of the new increments may be varied in accordance with the results of the evaluation. The addition of an increment to one or more of the parameters sets the system at a new point of operation. As the increments are added, the point of operation of the system is progressively moved from the initial point $X_i$, $Y_i$, $Z_i$, to the point of optimum operation $X_o$, $Y_o$, $Z_o$, in a series of steps. The pattern which may be followed in the practice of this invention may take any convenient form. A typical pattern would be one including the following steps:

First step, the addition of all three increments, $\Delta X$, $\Delta Y$, $\Delta Z$;
Second step, the addition of only $\Delta X$;
Third step, the addition of all increments $\Delta X$, $\Delta Y$, $\Delta Z$;
Fourth step, the addition of only $\Delta Y$;
Fifth step, the addition of $\Delta X$, $\Delta Y$, $\Delta Z$;
Sixth step, the addition of only $\Delta Z$.

With the system set at $X_i$, $Y_i$, $Z_i$ the operation is measured and recorded and then the first increments are added. The first step would change the setting of the system to $X_i+\Delta X$, $Y_i+\Delta Y$, and $Z_i+\Delta Z$. The operation of the system at this new point is recorded and a comparison is made between the value at the initial point and the value at the new point. If the value at the new point is lower than the value at the initial point, the system is reverted to the initial point and the polarities of all or certain of the variables are changed. It may be assumed that the polarities of all the increments are changed. With the polarities of the increments changed the second step is carried out and the system is reset to a new point $X_i-\Delta X$, $Y_i$, $Z_i$. The operation of the system is now again recorded and a comparison made. If in the case again there has been no improvement in the operation, the system is again reverted to its initial point and the polarity of the increment $\Delta X$ again changed. The third step is then carried out. This process is repeated until the system is set at a new point at which an improvement in the operation is measured. When an improvement is measured, the succeeding increment is added to the variable at the point at which the improvement is measured and new comparisons are made with the recorded operation at this new point.

For example, if an improvement is measured following the second of the above-described changes, the third step is carried out from the point $X_1-\Delta X$, $Y_1$, $Z_1$. The third step changes the system to the point $X_1-2\Delta X$, $Y_1-\Delta Y$, $Z_1-\Delta Z$. At this new point there is again a recording of the operation of the system and a comparison with the operation at the last point. This mode of operation continues until the operation of the system is optimalized at $X_o$, $Y_o$, $Z_o$.

It may be that as the operation of the system in accordance with this invention is progressing, a region of optimum operation is passed. The evaluation of the operation may show improvements for a series of settings followed by a setting at which no improvement is shown. This would indicate that the system has passed through or around an optimum. This invention provides for such an occurrence. In accordance with this aspect of the invention the optimum point is now found or approached by adding increments which are substantially smaller than the increments originally added. The attainment of an optimum point is in the practice of this invention signalled by a predetermined number of successive incremental changes, none of which measure improvement. In the practice of this invention following this number of changes the system is set to detect any drift from maximum.

This invention includes within its scope, not only methods for optimalizing the operation of a system, but also apparatus used in the practice of the methods. For recording the operation of the system, a plurality of registers are provided in accordance with this invention. In one register the operation following each change is recorded. In another, the prior optimum operation is recorded. A third register serves for transferring the recordings so that the optimum operation is available in the second register for comparisons with succeeding operations.

In the practice of this invention the record in the first register is removed if the comparison reveals that the operation in the second register exceeds that in the first. If the comparison reveals that operation in the first register exceeds that in the second, the record in the first register is transferred to the second. This is accomplished effectively by transferring the record in the first register to the third removing the record from the second register and transferring the record from the third register to the second.

In accordance with this invention, high precision in the recording of the operation of the system is achieved by recording the operation at each setting of parameters as a binary number defined by a plurality of off-on devices, such as relays or properly connected discharge devices, transistors, or magnetic amplifiers. For this purpose the actuated condition of relay or the conducting condition of discharge device or transistor may be regarded as representing the number 1 and the unactuated or nonconducting condition as the number 0. The number of components used to define the operation may be selected to correspond to the desired precision, for example, seven components permit the counting of a number reaching the magnitude 127. This would permit recording of operation, for example, as measured by index of refraction, from 0 to 127; the three digits having any convenient denomination, such as 127, .0127, or .000127.

The records on the registers are evaluated by electrical circuits responsive to the conditions of the various relays or the state of conductivity of transistors or discharge devices. In accordance with a specific aspect of this invention, a novel evaluation apparatus for comparing registers of the relay type is provided. In this apparatus the contacts of the relays are so connected as to respond in one way if the number defined by one set of relays is higher than that defined by the other, and in another way if the converse is true.

The incremental changes in the parameters are in the practice of this invention effected electrically. In applying this invention to the making of mono-styrene, as disclosed above, the flow of ethyl-benzene and steam is controlled by valves, the openings of which may be controlled by electromagnets. The temperature may be controlled by electrical heaters. The parameters are then controlled by controlling the exciting currents of the electromagnets and the heating currents. The controls are effected by varying the potentials derivable from potentiometers or voltage dividers the settings of which are determined by stepping switches or counters. In accordance with a still further specific aspect of this invention, a novel Counter Unit is provided for setting the potentiometers and thus measuring out the increments of the parameters to be added. This Counter Unit includes a Major Counter and a Minor Counter so interconnected that the Minor Counter counts the increments to be measured out by the Major Counter and interrupts the operation of the Major Counter once the predetermined number of increments are counted out.

It is one of the features of this invention that the addition of increments to the parameters follows a predetermined pattern. In accordance with one of the specific aspects of this invention, apparatus is provided which operates to identify the point in the pattern at which the optimalizing apparatus is operating.

Definition of Terms

In describing the invention, it is convenient to use certain terms or expressions having peculiar significance with respect to the invention. It is believed desirable to define the principal terms or expressions which will be used.

A move is defined as the process of adding an increment such as $\Delta X$, or $\Delta Y$, or $\Delta Z$, or increments, such as $\Delta X$, $\Delta Y$, $\Delta Z$ to a parameter or parameters.

A success is defined as a move which has resulted in the improvement of the operation of the system controlled.

A failure is defined as a move which has resulted in no improvement in the operation of the system. A failure may arise either where the operation of the system is the same as before the move or where the operation of the system is lower than before the move.

A modulo is defined as a step in the pattern of increments which are added to the parameter or parameters. Thus, $\Delta X$, $\Delta Y$, $\Delta Z$ is the first modulo, $\Delta X$ the second, $\Delta X$, $\Delta Y$, $\Delta Z$, the third, $\Delta Y$ the fourth, etc.

A register is defined as a system of relays by the actuation or unactuation of which a magnitude measuring the operation of the system is recorded as a binary number.

In the practice of this invention, the polarity changes and the magnitudes of the increments change as the optimalizing of a system progresses. Corresponding to these changes, the increments are regarded as having status a zero status, a first status, and a second status, and the apparatus is regarded as having two states—a first state and a second state. The increments are in status zero at the start of an operation and pass into status one after several moves, the number of moves preferably being different for each of the parameters. The increments pass into status one from status two after a success in state two. The apparatus is in state one at the start of an operation and passes into state two either when four failures occur at the start of an operation or when the parameters are all in status two. In state two the increments are smaller than in state one.

Figure 3:
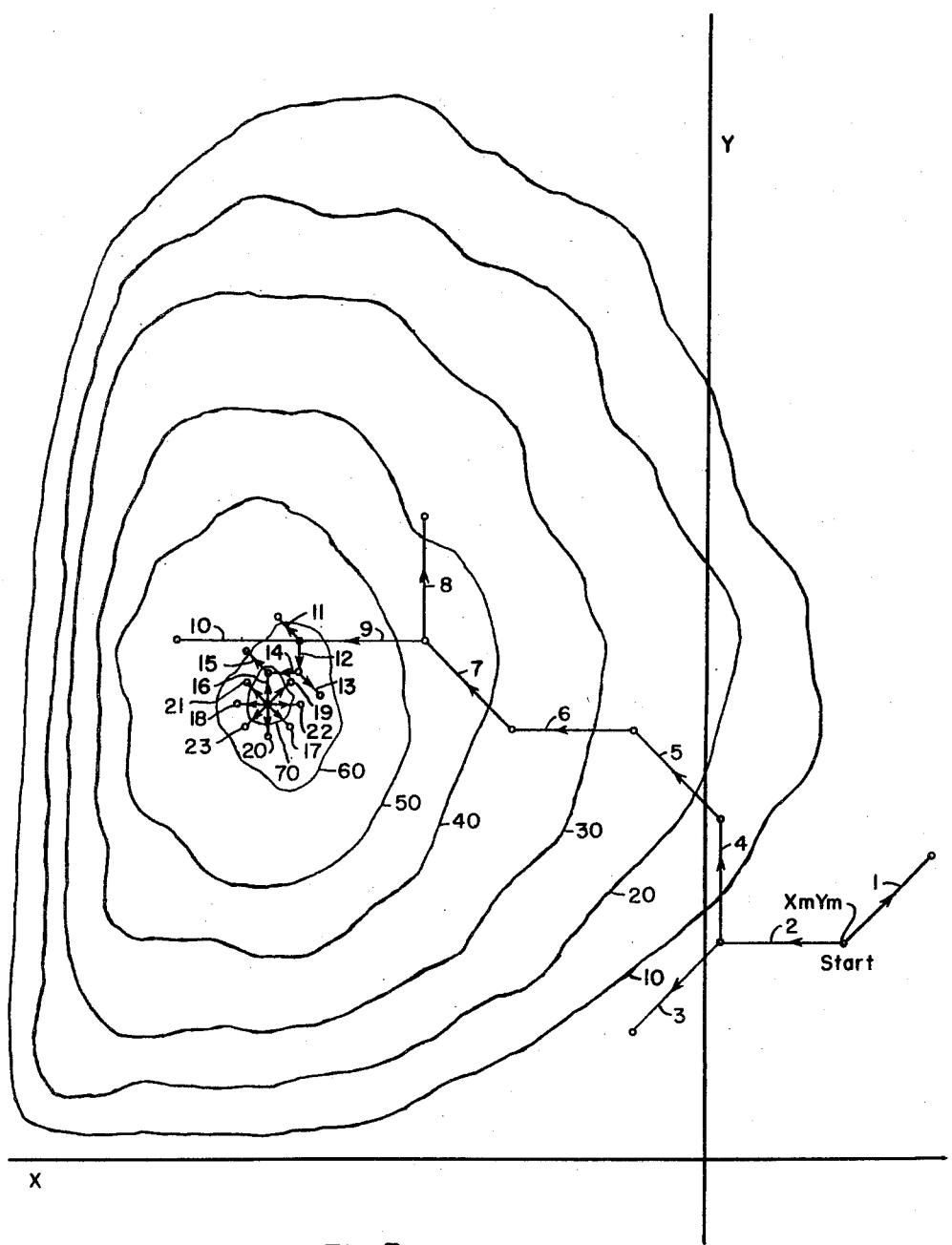
Figure 4A:
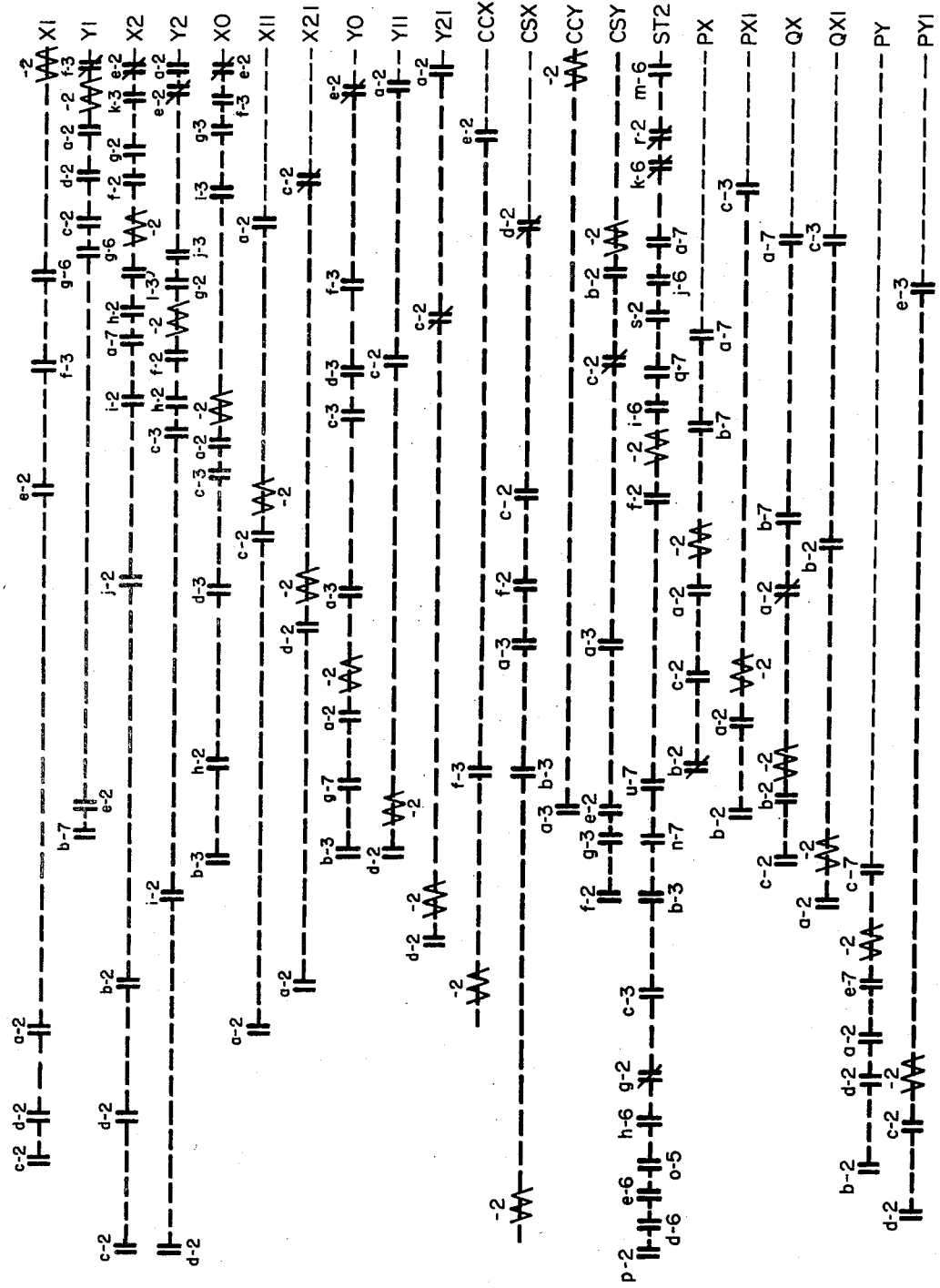
Figure 4B:
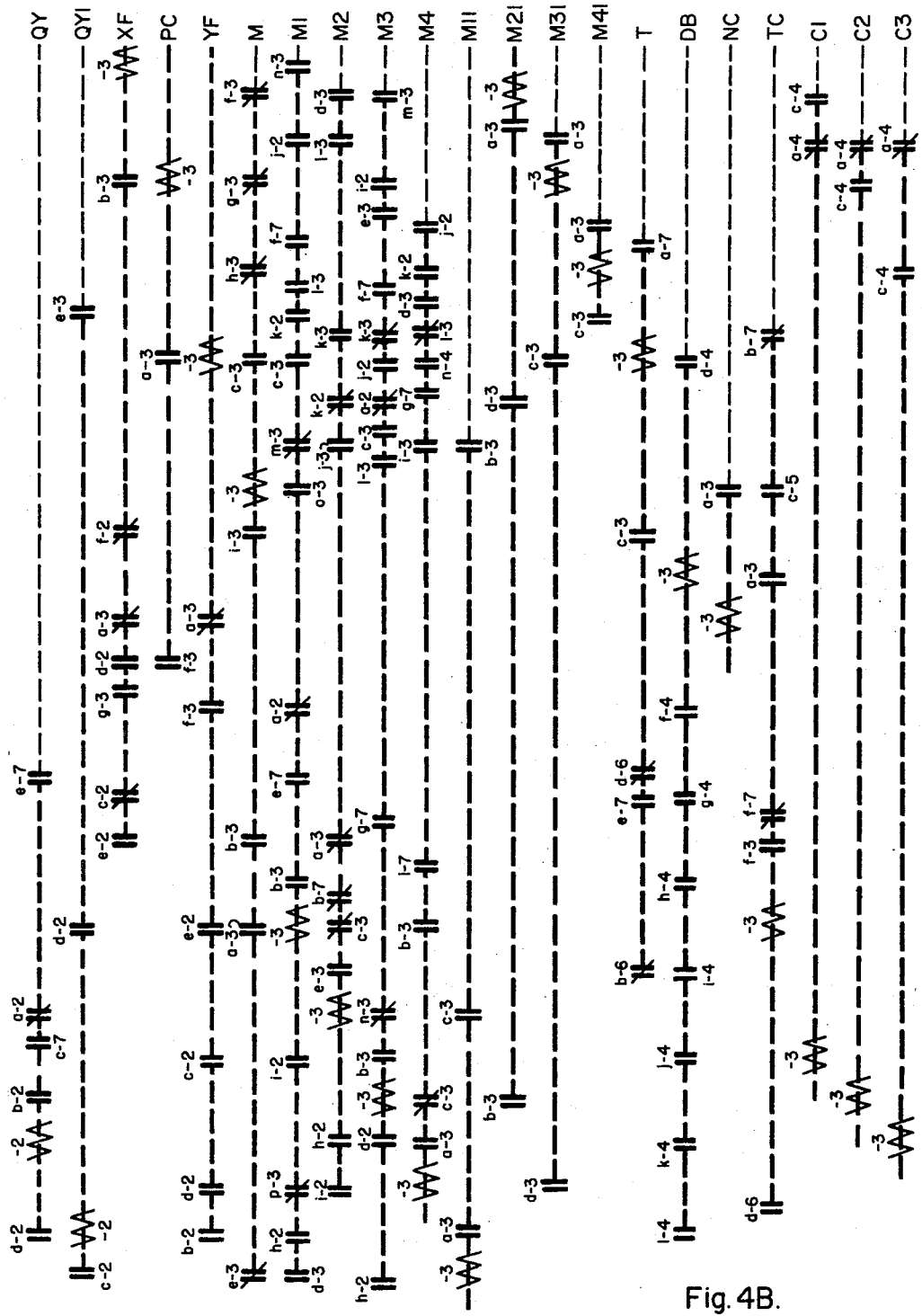
Figure 4C:
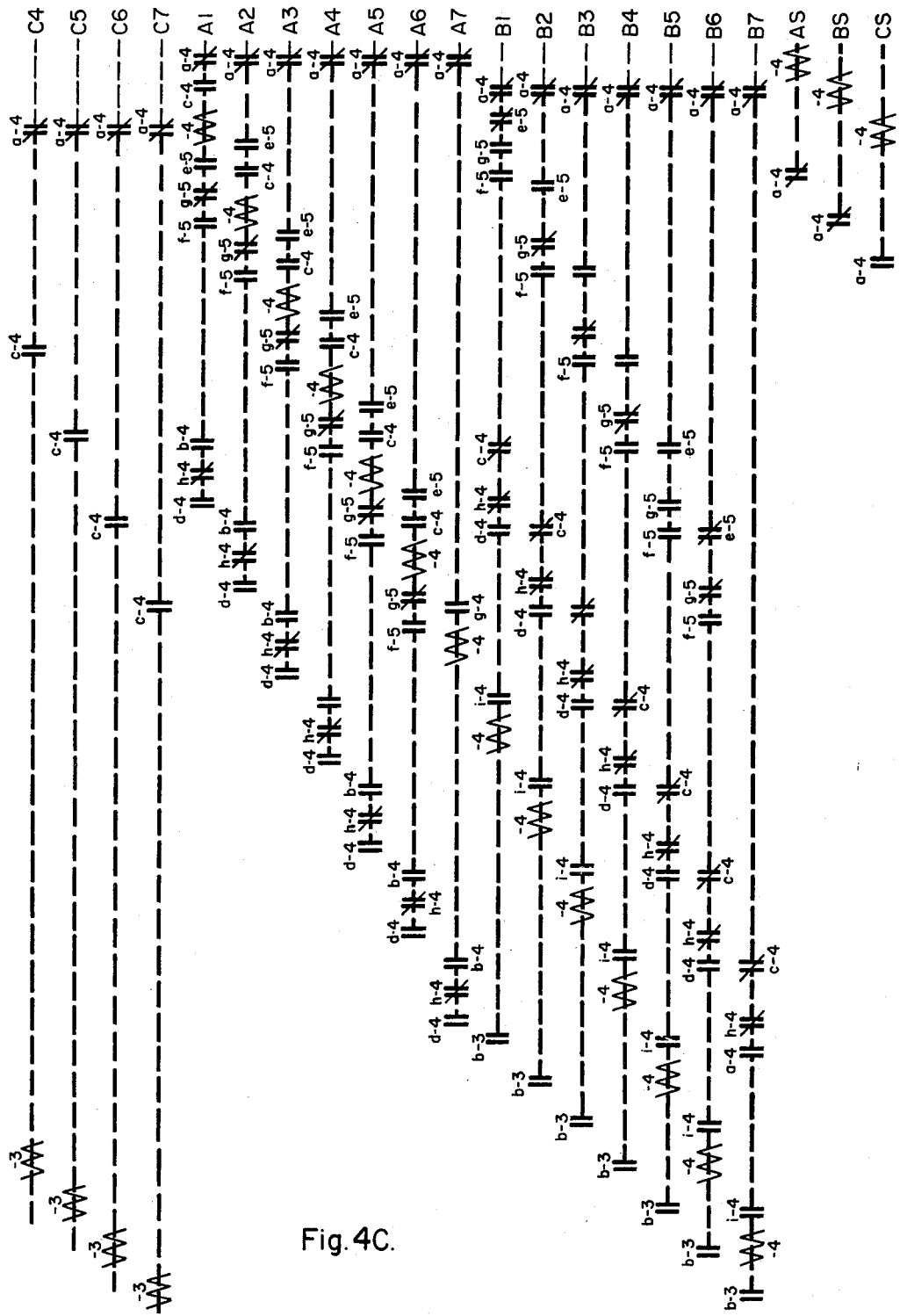
Figure 4D:
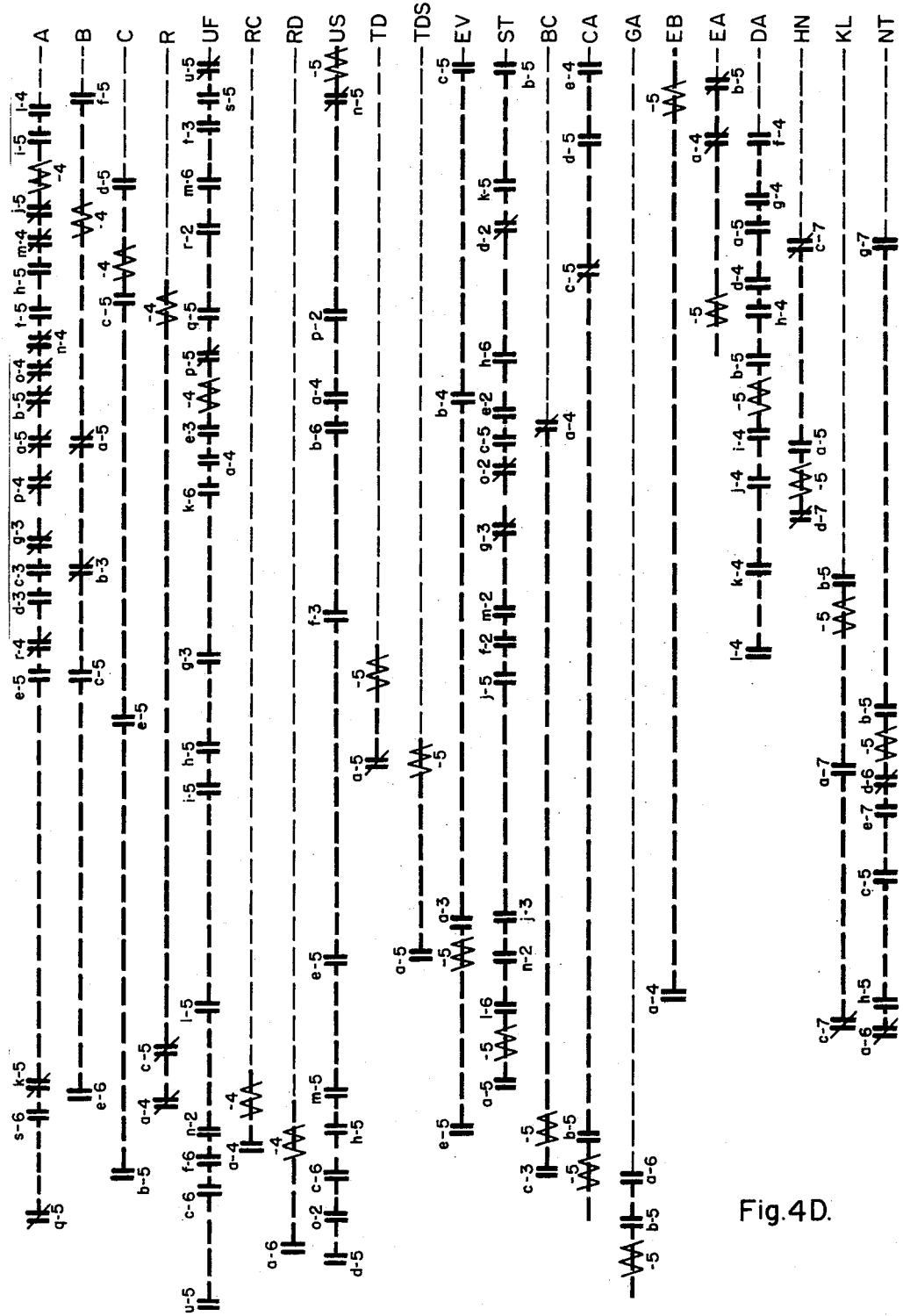
Figure 4E:
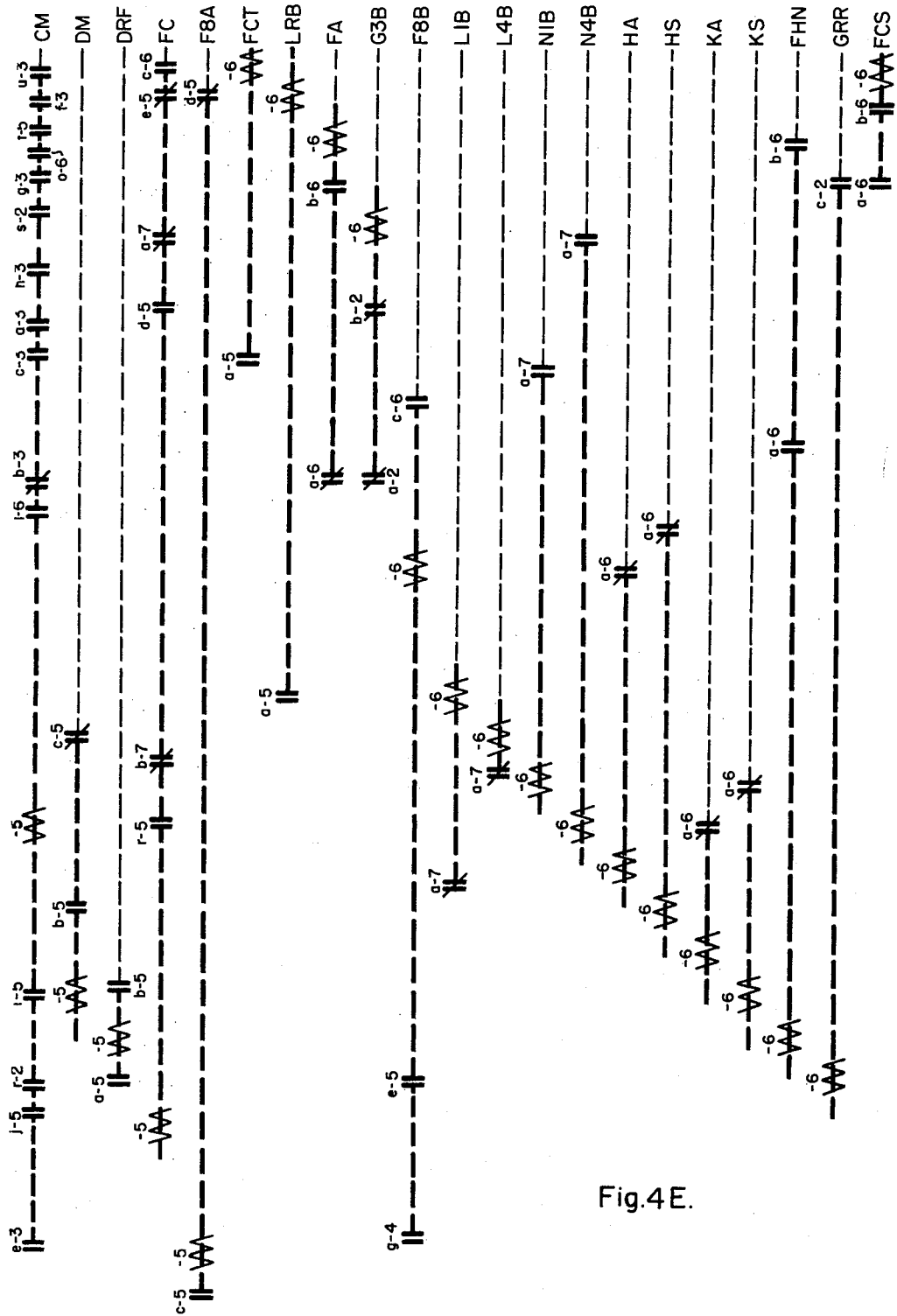
Figure 4F:
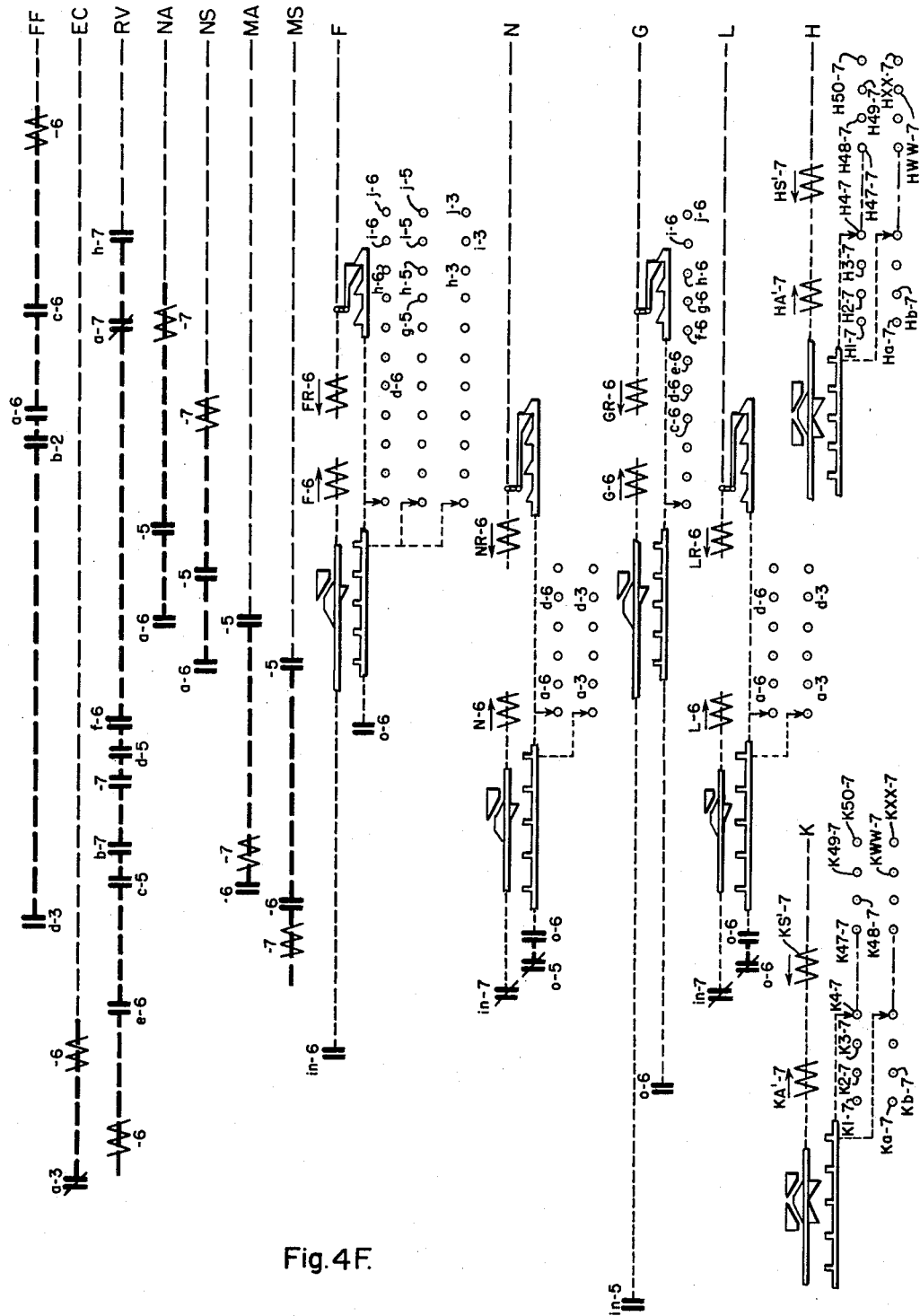

The novel features considered characteristic of this invention are disclosed generally above. The invention itself, both as to its organization and as to its method of operation, together with additional objects and advantages thereof, will be understood from the following description of a specific embodiment of the invention taken in connection with the accompanying drawings, in which:

FIGURE 1 is a block diagram showing the essential components of a preferred embodiment of this invention, and the relationship between these components;

FIGS. 2A through 2F together constitute a circuit diagram of the preferred embodiment of this invention;

FIG. 3 is a graph illustrating the operation of this invention; and

FIGS. 4A through 4F constitute stem sheets showing the stem and contact arrangements of the relays of FIGS. 2A through 2F.

Introductory Explanation

The specific embodiment of the invention disclosed herein is apparatus for setting two variables X and Y of a Controlled System so that the operation of the system is at an optimum. With reference to the example discussed above, the two variables may be any two of the three mentioned, that is, the flow of ethyl-benzene and the flow of steam or either of these and the temperature. A two-variable control is selected for the purpose of facilitating the explanation of the apparatus. The variables are X and Y and the pattern of increments which is followed by the apparatus disclosed herein includes the steps $\Delta X$ and $\Delta Y$; $\Delta X$; $\Delta X$ and $\Delta Y$; $\Delta Y$. This invention, in its broader aspects, is applicable to the control of three or more variable parameters.

The specific apparatus disclosed includes a plurality of relays, each having a plurality of contacts. Each relay is identified by capital letters or capital letters and numbers which have a general significance as to the purpose of the relay. Thus, a relay may be identified by letter A or by A1. The contacts of the relays are identified by lower case letters which appear after the capital letters. For example, a contact of relay A1 is identified A1a or A1b. In the discussion the contacts of the relays are referred to simply as front and back rather than as front contact and back contact. A front is a contact which is open when the relay is deenergized and a back is a contact which is closed when the relay is deenergized. In the drawings, the relays are represented by rectangles. Relays which drop out a predetermined time interval after they are deenergized are represented by rectangles, the long sides of which are double lines. There are also time delay relays in which the delay is produced by a capacitor connected to discharge through the core after the supply to the coil is interrupted. Front and back contacts are represented by their conventional symbols. To facilitate the understanding of this invention, the conditions of the relays and the contacts during the stand-by condition of the apparatus are indicated. A relay which is actuated during stand-by is identified by a dot near or in the symbol. A contact of an energized relay is identified by a dot near the symbol. Thus, a dot adjacent to a symbol for a back contact means that during stand-by the contact is open.

The general functions of the various relays included in the apparatus disclosed herein are given briefly in the following table:

| Relay | Function |
| --- | --- |
| ST | Starting relay. Actuation of this relay starts optimalizing operation which then proceeds automatically to reset. |
| X0, Y0 | Status relays actuated when the parameters X and Y are in status 0. |
| X1, Y1 | Corresponding relays for status 1. |
| X2, Y2 | Corresponding relays for status 2. |
| CSX, CSY | Change-of-status relays for affecting change from status 1 to status 2. |
| X11, Y11, Y21, CCX, CCY | Auxiliary relays involved in change-of-status. |
| PX, PY | Positive polarity relays actuated when X or Y increments have a positive polarity. |
| QX, QY | Negative polarity relays. |
| XF, YF | Change of polarity relays actuated on the occurrence of a failure to produce a change of polarity in the corresponding increment. |
| PX1, PY1, QX1, QY1, PC | Auxiliary relays involved in change of polarity. |
| ST2 | This relay is actuated to set the apparatus in state 2. |
| M1, M2, M3, M4 | Modulo relays. Actuated when apparatus is in a modulo corresponding to the relay. |
| M, M11, M21, M31, M41 | Auxiliary relays actuated during the change from one modulo to the next. |
| T | Actuated to start the measuring out of the increments. |
| N4B, L4B | Actuated to stop the measuring out when a long increment has been measured out. |
| N1B, L1B | Actuated to stop measuring out when a short increment has been measured out. |
| A1 through A7 | Relays of A Register which carries the highest magnitude of operation for a series of prior moves. |
| B1 through B7 | Relays of B Register which carries the magnitude of the operation for each new move. |
| C1 through C7 | Relays of C Register for transferring highest magnitudes between B and A. |
| AS, BS, CS, A, B, C | Auxiliary relays associated with Registers A, B, and C, respectively. Relays A, B, and C are actuated when Registers A, B and C carry a record. |
| EA, EB, EC | Actuated to reset A, B, or C Registers. |
| BC | Actuation initiates transfer of record from B Register to C Register in the event of a success. |
| CA | Actuated to transfer record from C Register to A Register. |
| DA | Actuate to cause record of operation to be transferred to A Register at start of an optimalizing process. |
| RD | Actuated a predetermined time interval after increments are added to permit transfer of magnitude of operation of controlled system to Register B. |
| DB | Actuated to cause recording of system operation in Register B in dependence on setting of D contacts. |
| TC | Actuates DB after increment has been added to system. |
| R, RC | Auxiliary relays controlling RD in response to DA and DB. |
| NC | Maintains change of modulo in case of delay in operation of change of polarity or change of status relays. |
| EV | Actuated to start evaluation of record in B Register, that is, comparison with record in A Register. |
| TD, TDS | Auxiliary relays introduce time delay between recording in B Register and evaluation. |
| UF | Actuated when a failure occurs. |
| US | Actuated when a success occurs. |
| CM | Determines operation of optimalizing apparatus selectively in response to success or failure. |
| RV, NT, DM | Cooperate to return Controlled System to setting before move on occurrence of failure. |
| HA', KA', HS', KS' | Major counters for measuring increments in parameters. HA' counts X increments in a forward direction; KA' counts Y increments in a forward direction; HS' and KS' count in a reverse direction. |
| NA, NS, MA, MS, NH, KT, KL | Prevents major counters from resetting to 0 when the wipers have completed a cycle (contacts of major counters are arranged in complete circles). |
| N, L | Minor counters. Cooperate with HA', HS', KA', KS', to measure increments. |
| L1B, L4B, N1B, N4B | Determine magnitudes of increments. L4B, N4B produce four times magnitude of L1B, N1B. |
| NR, LR | Reset coils for N and L. |
| HA, HS, KA, KS | Auxiliary relays producing cooperation between HA', HS', KA', KS' and N and L, respectively. |
| G-GR | Minor counter for counting successes in state 2. |
| GRR | Auxiliary relay for interlocking G-GR so as to prevent malfunctioning. |
| GA | Auxiliary relay cooperates with G-GR to produce counting. |
| F-FR | Failure counter, counts both in state 1 and state 2. |
| FA | Auxiliary relay causes counting of F. |
| FF | Cooperates with FFR to set apparatus in state 2 after four failures. |
| F8B | Sets apparatus for drift after eighth failure. |
| FC, FCT | Set A and B Registers to record drift. |
| DRF | Drift relay—Starts a new optimalizing operation following success after eighth failure. |

Description

In the block diagram shown in FIG. 1, the system which is to be optimized is labeled Controlled System. The increments ΔX and ΔY are added to the parameters X and Y of the Controlled System by a controller which is electrically controlled from the Major Counter Unit through a pair of potentiometers POTX and POTY (FIG. 2F) respectively. A quantity proportional to the operation of the Controlled System is derived from the controlled system through an Output Converter.

The apparatus in accordance with this invention includes additionally to the Major Counter Unit, a Minor Counter Unit, the counters of which are so interconnected with the counters of the Major Unit as to count out increments of the proper magnitude. The apparatus also includes a Counter Control Unit which causes operation of the Counter Unit under the proper circumstances.

The apparatus includes a Starting Unit for starting an optimalizing operation. The Starting Unit is actuable by instantaneous closing of a push-button SW and the optimalizing operation continues automatically once this button is released and permitted to reopen. The Starting Unit is connected to the Output Converter and when actuated conditions the Output Converter to transmit a magnitude proportional to the operation of the Controlled System.

The apparatus further includes Registers A, B and C in which are recorded the magnitudes involved in the operation of the System as binary numbers. Registers A and B are adapted to be connected to the Output Converter through a plurality of selectively operable contacts D (FIG. 2C) corresponding in number to the relays of the Registers. These contacts D are set by the Output Converter to define as a binary number the magnitude of the operation of the Controlled System at any time. At the start of the operation, the initial setting of the Controlled System is recorded in Register A following actuation of the Starting Unit. The apparatus includes a Status Polarity Unit and Modulo Unit which are interconnected with Register A so that once the magnitude is recorded in Register A, the Modulo Unit is set to correspond to the first move modulo (ΔX and ΔY) of the pattern. The Modulo Unit is interconnected with the Counter Control Unit and the Major Counter Unit so that on being set, the Modulo Unit causes the Major Counter Unit to be actuated to introduce the first move into the controlled system.

The apparatus also includes a B-Register Setting Unit. This Unit is interconnected with the Major and Minor Counter Units and with Register B so that once the first move is completed, a magnitude corresponding to the operation of the Controlled System at the new setting is recorded in Register B. The connection is through a timer (relay RD, FIGS. 2C and 2E) which times out only after a sufficient interval elapses to enable the Controlled System to stabilize so that the magnitude of its operation is reasonably approximate to the final magnitude of operation which would be attained in the new setting. If the trend of the operation of the Controlled System is non-oscillatory towards an increase or a decrease, it is not necessary that the system reach its final operation following the first or any later move before the operation is recorded in Register B. It is only necessary that the record in Register B clearly show whether an increase or a decrease has occurred. Where the System is non-oscillatory, this will be manifested after a relatively short time interval.

Once the recording in Register B is completed, the magnitude in Register A and the magnitude in Register B are compared by an Evaluate Unit which is actuated when the record in Register B is complete. The Evaluate Unit has two responses, one for the case in which the record in Register B is higher than the record in Register A, and the other when the records are equal or when B is lower than A. When the record in Register B is higher than in Register A, the move is a success. Otherwise, the move is a failure.

The apparatus includes a B–C Register Transfer Unit which is actuable by the Evaluate Unit in the case of a success. This Unit causes the record in Register B to be transferred to Register C. The record in Register A is then removed and the record in Register C is transferred to Register A by a C–A Register Transfer Unit. The new record represents operation of a higher magnitude of the Controlled System than the record removed. When the record in Register A is removed, the Modulo Unit is actuated and sets to a new modulo in the pattern. Once the transfer from Register C to Register A is effected, the record in Register C is removed. With this removal, a successful move is completed. The Major Counter Control Unit is then again actuated to introduce another increment into the parameters of the Controlled System.

In the event of a failure the Evaluate Unit operates through the Register Release Unit to remove the record from Register B and then through the Return Unit to return the Major Counter Unit and POTX and POTY to their settings before the move. In addition, the Status Polarity Unit is actuated to change polarity or status and the State Unit is actuated under certain circumstances to change state. The apparatus also includes a Return Unit. The Return Unit is actuated by the Evaluate Unit in the event of a failure and actuates the Major Counter Unit to return the Controlled System to the setting which this System had prior to a move which failed.

The apparatus further includes a Success Counter Unit and a Failure Counter Unit. The Success Counter Unit operates only with the apparatus in state 2, and resets the apparatus to state 1 and the increments to a lower status than 2 on the occurrence of a predetermined number of successes. The Failure Counter Unit operates to count failures and to control the state and the operation of the apparatus at and near the optimum point of the system.

In FIGS. 2A through 2F, the optimalizing apparatus is shown in detail. The apparatus is supplied from conductors LP and LN of a direct-current supply of adequate potential to actuate the various relays.

Figure 2A:
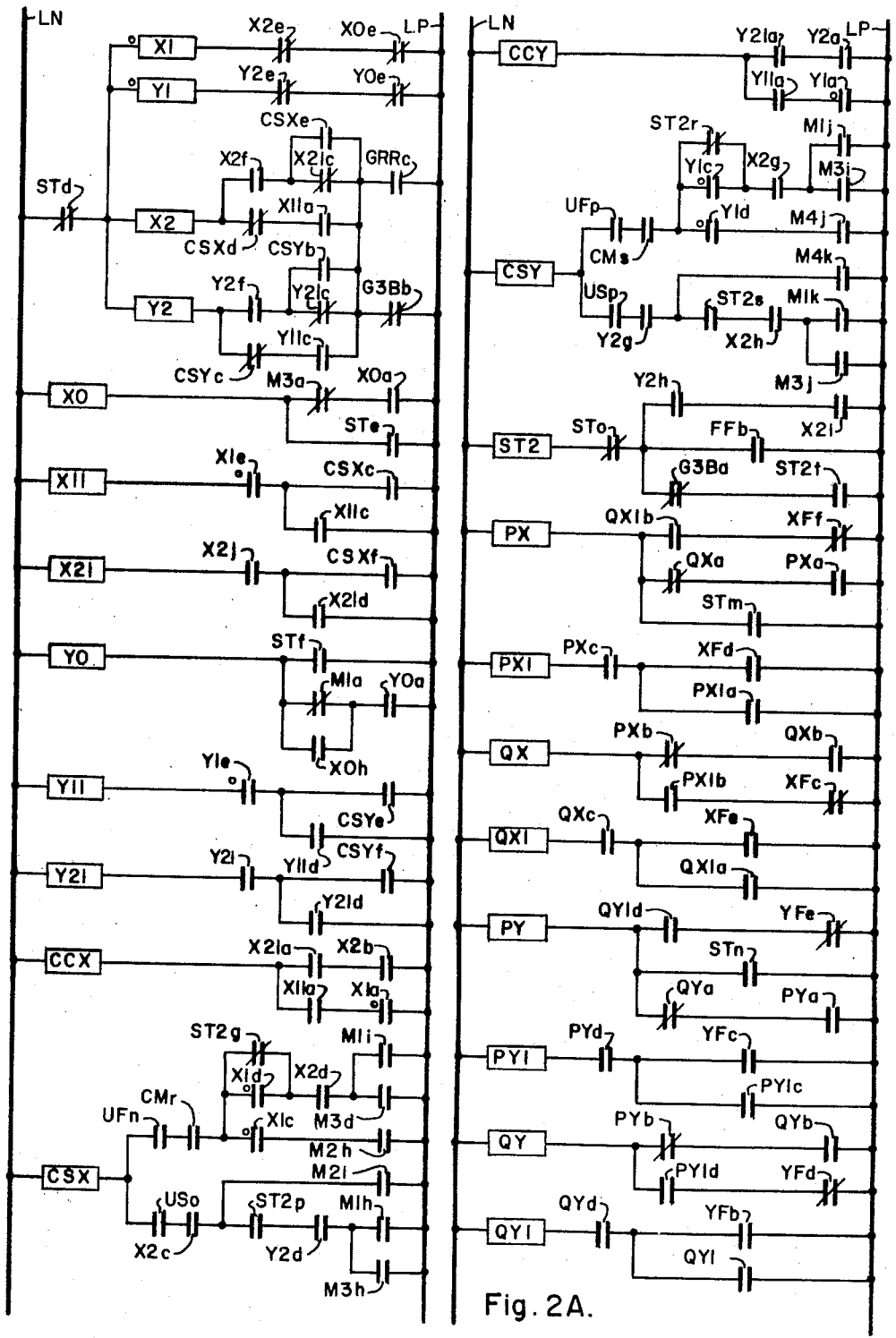
Figure 2B:
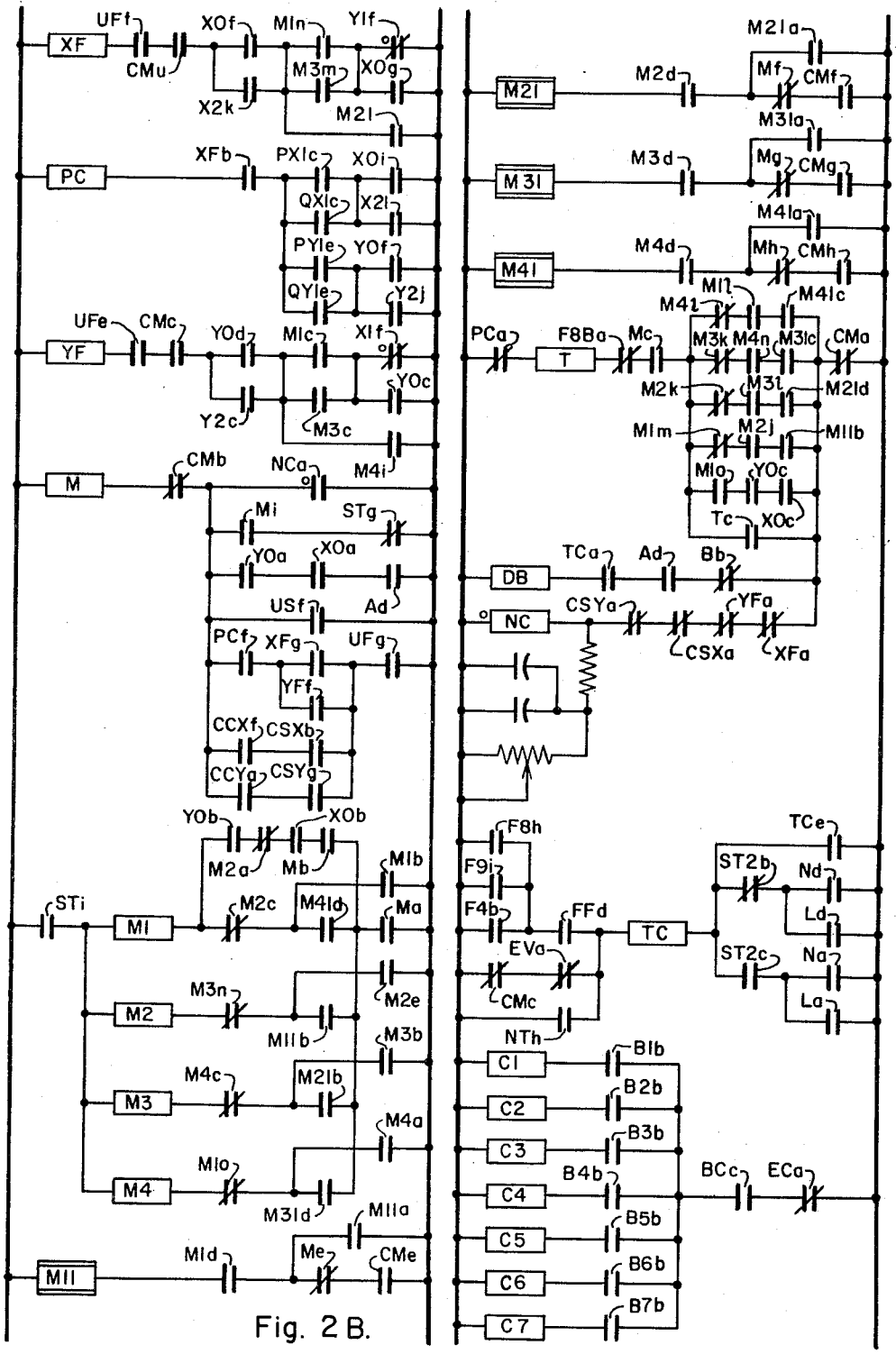
Figure 2C:
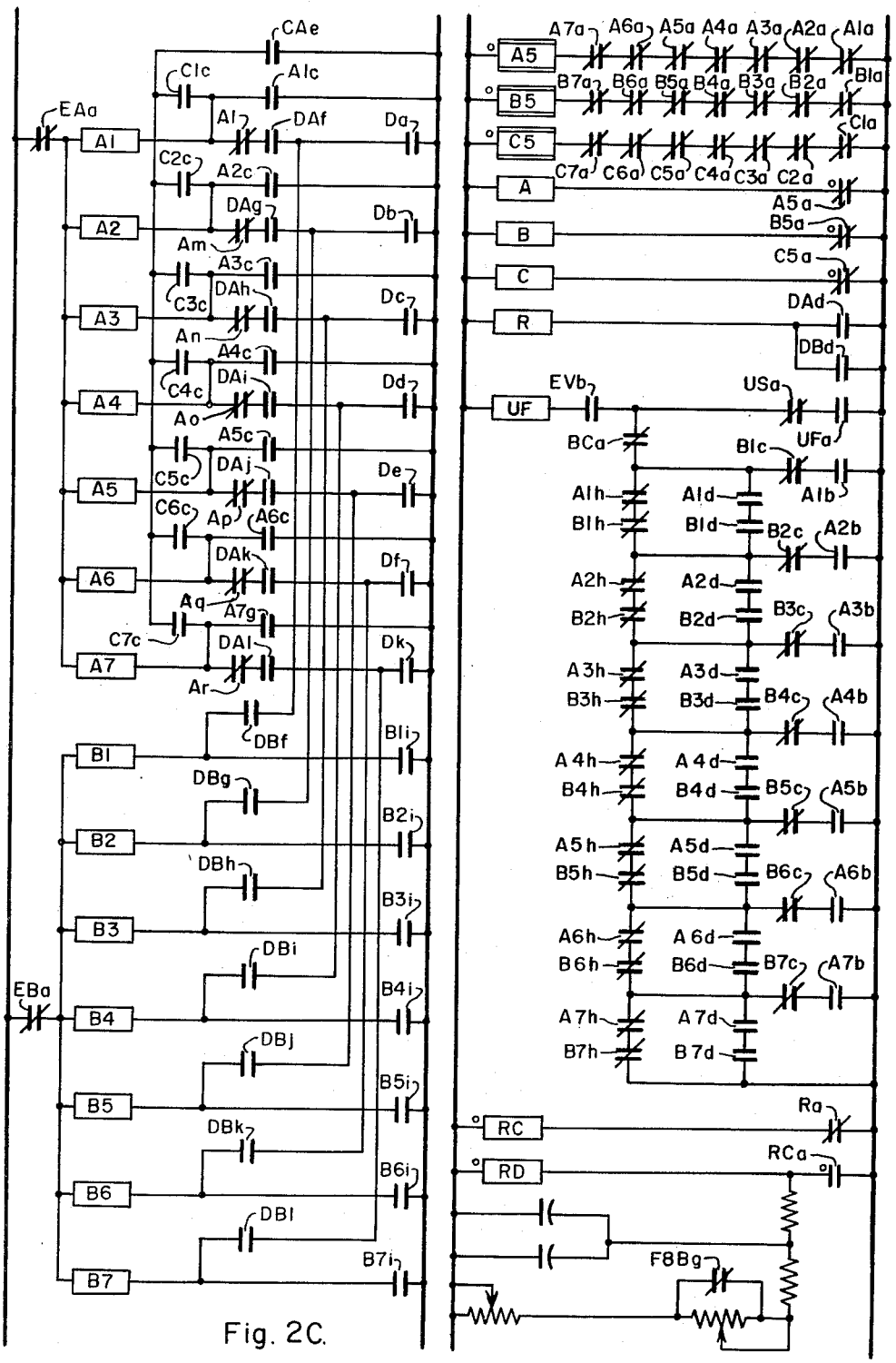

The Starting Unit includes relays ST (FIG. 2D), DA, R, RC and RD (FIG. 2C). The coil of ST is adapted to be connected between conductors LP and LN through the pushbutton SW and to be locked in through its front STa and back Ak. During drift the coil of ST may also be connected between conductors LP and LN through the front DRFb.

The coil of DA is adapted to be connected between LP and LN through front STc, back Aa, back Ba. The coil of DA is adapted to be locked in through back Ab and front DAb. The coil of DA is also adapted to be connected between LP and LN through front FCd, front FCTa and back UFp. This sets the apparatus for drift.

The coil of R is adapted to be connected between LP and LN through front DAd or through front DBd. DAd is closed at the start and DBd during subsequent moves. The coil of RC is adapted to be connected between LP and LN through back Ra, and the coil of RD is adapted to be connected between LP and LN through front RCa. To produce the desired timing in the operation of RD, the coil of RD is shunted by capacitors and resistors, certain of which may be shunted out by back F8Bg. F8Bg is opened during drift. RD has a back RDa which controls the Output Converter (FIGS. 1 and 2E) conditioning it to operate. With F8B actuated, the delay between the actuation of DB, that is, the completion of insertion of the increment in the Controlled System, and the dropping out of RD which permits the transmission of a magnitude corresponding to the operation of the Controlled System to the Registers is greater than with F8B unactuated. The significance of this is that during drift after the System has reached an optimum the delay between the repeated checks of the System to determine if the System has drifted from maximum is substantially greater than the duration between moves when the System is being set to its optimum by incremental changes in the parameters.

The Status Polarity Unit (FIGS. 2A, 2B) includes the status relays X0, Y0, X1, Y1, and X2, Y2, the change-of-status relays CSX and CSY, the polarity relays PX and PY and QX and QY, and the change-of-polarity relays XF and YF. In addition, there are auxiliary relays X11, X21, Y11, Y21, CCX, CCY, PXI, PY1, QX1, QY1, and PC. The coil of X0 is adapted to be connected between LP and LN through front ST*e*, and to be locked in through front X0*a* and back M3*a*. The coil of Y0 is adapted to be connected between LP and LN through front ST*f* and to be locked in through front X0*h* and front Y0*a* or through back M1*a* and front Y0*a*. The coils of X1, Y1, X2, Y2 are connected in parallel through back ST*d* to LN. The coil of X1 is connected to LP through back X0*e*, and back X2*e*. The coil of Y1 is similarly connected to LP through back Y03 and back Y2*e*. The coil of X2 is adapted to be connected to LP either through front GRR*c* or through back G3B*b* and through front X11*a* and back CSX*d* and to be locked in through front X2*f* and back X21*c* or front CSX*e*. The coil of Y2 is similarly adapted to be connected to LP through front GRR*c* or back G3B*b*, and front Y1*c* and back CSY*c* or front Y2*f* and back Y21*c* or front CSY*b*. The coil of X11 is adapted to be connected between LP and LN through front CSX*c* and front X1*e* and to be locked in through X11*c*. The coil of Y11 is analogously adapted to be connected. The coil of X21 is adapted to be connected between LP and LN through front X2*j* and back CSX*f* and to be locked in through front X21*d*. The coil of Y21 is analogously adapted to be connected. The coil of CCX is adapted to be connected between LP and LN through front X2*j* and back CSX*f* and to be locked in through front X21*d*. The coil of Y21 is analogously adapted to be connected. The coil of CCX is adapted to be connected between LP and LN through front X2 and front X21*a* or front X1*a* and front X11*a*. The coil of CCY is analogously adapted to be connected. The coil of CSX is adapted to be connected between conductors LP and LN through the following alternative paths:

In state 1, front M2*h*, front X1*c*, front CM*r*, front UF*n*;
In state 1, status 2, front M3*d*, front X2*d*, back ST2*g*, front CM*r*, front UF*n*;
In state 1, status 2, through front M1*i*, front X2*d*, back ST2*g*, front CM*r*, front UF*n*.
In status 2, front M2*i*, front X2*c*, front US*o*;
In status 2, state 2, front M1*h* or front M3*h*, front Y2*d*, front ST2*p*, front X2*c* and front US*o*.

Back ST2*g* is shunted by front X1*d*. The coil of CSY is analogously adapted to be connected.

The coil of PX is adapted to be connected between LP and LN through front ST*m*, or through back XF*f* and front QX1*b*. The coil of PX is adapted to be locked in through front PX*a*, and back QX*a*. The coil of PY is analogously adapted to be connected. The coil of PX1 is adapted to be connected between LP and LN through front PX*c*, front XF*d*, and to be locked in through front PX1*a*. The coil of PY1 is analogously adapted to be connected. The coil of QX is adapted to be connected between conductors LP and LN through back XF*c* and front PX1*b* and to be locked in through front QX*f* and back PX*b*. The coil of QY is analogously adapted to be connected. The coil of QX1 is adapted to be connected between LP and LN through front XF*e* and front QX*c* and to be locked in through QX1*a*. The coil of QY1 is analogously connected. The coil of XF is adapted to be connected between conductors LP and LN through back Y1*f*, front MM1*n*, front X0*f*, front CM*u* and front UF*t*. Y1*f* is shunted by front X0*g*, M1*n* is shunted by M3*m*, X0*f* is shunted by front X2*k*. Y1*f* and M1*n* are shunted by M21.

It is seen that XF is not actuable in status 1. This means that in the event of a failure in status 1, a change of polarity does not occur.

YF is connected between conductors LP and LN similarly to XF and in this case also the connection is such that a change of polarity does not occur on failure in status 1.

The coil of PC is adapted to be connected between LP and LN through XF*b* in the following alternative circuits:

Front X0*i*, front PX1*c*
Front X21, front QX1*c*
Front X0*i*, front QX1*c*
Front X21, front PX1*c*
Front Y0*f*, front PY1*e*
Front Y2*j*, front QY1*e*
Front Y0F*f*, front QY1*e*
Front Y2*j*, front PY1*e*

The State Unit includes the relay ST2 (FIG. 2A). The coil of this relay is adapted to be connected between conductors LP and LN through ST*o*, and front FF*b*; or through back ST*o* and front X2*i* and Y2*h*. The coil of ST2 is adapted to be locked in between conductors LP and LN through front ST2*t*, and back G3B*a*. Operation of FF thus transfers the apparatus from state 1 to state 2. In addition, the apparatus is transferred to state 2 when both X2 and Y2 are in status 2. Operation of G3B which results from three operations of G while the apparatus is in state 2, reverts the apparatus from state 2 to state 1.

The Modulo Unit (FIG. 2B) includes relays M1, M2, M3 and M4 and transfer relays M, M11, M21, M31 and M41. The transfer relays M11, M21, M31, M41 are of the type which pull in immediately when their coils have been energized but drop out after a short delay after the current through the coils is interrupted. The coils of M1, M2, M3 and M4 are connected to conductor LN through back ST*i*. Thus when ST is actuated, the coils M1, M2, M3 and M4 are deenergized. The coil of M1 is adapted to be connected to conductor LP through the following alternative circuits:

Front M*a*, front M*b*, front X0*b*, back M2*a*, front Y0*b*
Front M*a*, front M41*d*, back M2*c*
Front M1*b*, back M2*c*

The last is a lock-in circuit. The coil of M2 is adapted to be connected to conductor LP through front M*a*, front M11*b*, back M3*c*, and to be locked in through front M2*e*. The coil of M3 is adapted to be connected to LP through front M*a*, front M21*b*, back M4*c* and to be locked in through front M3*a*. The coil of M4 is adapted to be connected to LP through front M*a*, front M31*d*, back M1*c*, and to be locked in through front M4*n*. The coil of M11 is adapted to be connected between conductors LP and LN through front CM*e*, back M*e*, front M1*d*, and to be locked in through front M11*a*. The coils of M21, M31 and M41 are analogously connected. The coil of M is adapted to be connected between conductors LP and LN through back CM*b* and through the following parallel networks:

Front A*d*, front X0*a*, front Y0*a*
Front NC*a*
Back ST*g*, front M*i*
Front US*f*
Front UF*g*, front XF*g* or front YF*f*, front PC*f*
Front UF*g*, front CSX*b*, front CCX*f*
Front UF*g*, front CSY*g*, front CCY*a*

In discussing the modulo the four items of the pattern ΔX and ΔY, ΔX, ΔX and ΔY, ΔY will be referred to as the first, second, third and fourth modulo, respectively. The numbers following the letters M identify the modulo and M1, M2, M3 and M4 correspond to the numbers of the modulo. That is, relay M1 corresponds to and is actuated when the apparatus is set in modulo 1, M2 in modulo 2, M3 in modulo 3 and M4 in modulo 4. With this mode of labeling in mind, the state of the various relays involving contacts of relays M1 through M4, that is, whether they are energized or deenergized, in different modulo can readily be determined.

The Counter Control Unit (FIG. 2B) includes the relay T. The relay T is connected between conductors LP and LN through back CMa, front Mc, back F8Ba, and back PCa and the following parallel circuits:

Front M41c, front M1l, back M4l
Front M31c, front M4n, back M3k
Front M2d, front M3l, back M2k
Front M11b, front M2j, back M1m
Front X0c, front Y0c, front M1a The coil of relay T is locked in through front Tc.

The Major Counter United (FIG. 2F) includes major counters HA'–HS' and major counters KA'–KS'. Major counters HA'–HS' and KA'–KS' each include 50 contacts arranged in a circle. As the coil HA' or KA' is actuated the wiper of this major counter moves sequentially from contact 1 to contact 50. As HS' or KS' is actuated the wiper moves in the opposite direction. The Major Counter Unit also includes the relays NS, NA, MS, MA and the relays HN and KL. HN and KL cooperate to prevent the wipers of the Major Counters from passing from the last tap or the next to the last tap (H$ww$ or H$xx$ or K$ww$ or K$xx$) to the first tap (H$a$ or K$a$) or from the first or second tap (H$a$ or H$b$ or K$a$ or K$b$) to the last tap (H$xx$ or K$xx$). The contacts of the major counter HA'–HS' are connected to potentiometer POTX. This potentiometer includes a plurality of resistors which are connected in series between conductors LP and LN. As the wiper of the major counter moves it changes the relative number of resistors connected between each of the conductors and the wiper and thus the potential derivable from POTX. The major counter KA'–KS' is similar to the Counter HA'–HS' and is similarly related to potentiometer POTY. In addition to the taps connected to the resistors, the major counters include a plurality of taps HA'$in$, HS'$in$, KA'$in$, KS'$in$. These contacts are normally closed and are opened and reclosed during each movement of the wiper from one of the counting contacts to the other.

The Minor Counter Unit (FIG. 2E) includes minor counters N–NR and L–LR. The Minor Counter Unit also includes the relays N1B, N4B, L1B, L4B, HA, HS, KA, and KS. Major counter HA'–HS' is controlled by minor counter N–NR and major counter KA'–KS' is controlled by minor counter L–LR. Counters N–NR and L–LR have a plurality of taps which may be of the order of eight. The wipers of these counters move from one tap of the succeeding one as the actuating coil N or L of the counter is energized. The counters are reset by the reset coils NR or LR. The counters N and L include contacts N$in$ and L$in$ which are opened and reclosed during each movement of the wipers from one counting contact to the succeeding one.

The counting contacts of the Minor Counters N and L are labeled in the same manner as the other contacts, by lower case letters. But in this case, the contacts are labeled in sequence to correspond to the order in which they are engaged by the wiper. That is, the contact L$a$ is the first contact of L engaged by the wiper, the contact L$d$ is the fourth contact of L engaged by the wiper. The relays N and L also have off-normal contacts labeled N$o$ and L$o$. These contacts may be front or back and are closed or opened respectively when the wiper moves from its zero position.

The coil N is adapted to be connected between conductors LP and LN through back HS$a$, back HA$a$, front NA$a$, or front NS$a$ in parallel. The release coil NR is adapted to be connected between LP and LN through front N$o$, and either back T$d$ or front RV$f$ and back NT$a$. The coil L and the release coil LR are analogously connected.

The coils of L1B, N1B, L4B, N4B are adapted to be connected between conductors LP and LN through L$a$, N$a$, L$d$ and N$d$, respectively (that is the first taps and the fourth taps). The coils of HA, HS, KA, KS are adapted to be connected between conductors LP and LN through backs Ha'$in$, HS'$in$, KA'$in$ and KS'$in$, respectively. The coil HA' is adapted to be connected between LP and LN through the following circuits:

Back N4B$a$, back ST2$a$, front M1$f$ or M3$f$, back X2$a$, back RV$a$, back TC$b$, front PX$a$, back HN$c$, front T$a$, back N$in$, back FC$a$.

Back N4B$a$, back ST2$a$, front M2$b$, back RV$a$, back TC$b$, front PX$a$, back HN$c$, front T$a$, back N$in$, back FC$a$.

Back N4B$a$, back ST2$a$, front M1$f$ or front M3$f$, back X2$a$, front RV$h$, front NT$g$, front QX$a$, back HN$c$, front T$a$, back N$in$, back FC$a$.

Back N4B$a$, back ST2$a$, front M2$b$, front RV$h$, front N2$g$, front QX$a$, back HN$c$, front T$a$, back N$in$, back FC$a$.

Back N1B$a$, front ST2$g$, back M4$g$, back RV$a$, back TC$b$, front PX$a$, back HN$c$, front T$a$, back N$in$, back FC$a$.

Back N1B$a$, front ST2$g$, back M4$g$, front RV$h$, front NT$g$, front QX$a$, back HN$c$, front T$a$, back N$in$, back FC$a$.

The coil HS' is analogously connected.

It appears desirable to discuss briefly the significance of these circuits. The counters HA'–HS' are both actuable only in modulo 1, 2 and 3 both in state 1 and in state 2. In state 1, modulo 1 and 3 HA'–HS' are only actuable with X in status 0 or 1, in modulo 2 with X in any status. In state 1 major counter HA'–HS' is actuated through N4B$a$ in state 2 through N1B$a$. With RV and TC unactuated HA' is actuable through PX$a$, that is, when the X increment is positive, and HS' through QX$b$, that is, when the X increment is negative. The converse exists when RV is actuated and NT is also actuated. The significance in this is that when the major counter HA'–HS' is advanced with the increment positive, it is returned to the initial position after the polarity change by actuation of RV and NT if the X increment has been reversed following a failure. The converse occurs when the advance of Major Counter HA'–HS' is advanced with a negative X increment.

With the modulo and the polarity set the operation of the major counter HA'–HS' is controlled by the relay through front T$a$. Back N$in$ serves for counting and FC$a$ disconnects the major counter during drift.

The repetition is produced by relay N through back N$in$. The number of operations of the Counter is controlled by back N4B$a$ in state 1 and by back N1B$a$ in state 2. Since N4B is actuated after four counts of N and N1B after one count of N, it is seen that in state 1 major counter HA'–HS' advances four units for each actuation of T in state 1 and only one unit in state 2. Thus, the increments introduced in state 1 are four times as great as the increments in state 2.

Major counter KA'–KS' is connected analogously to major counter HA'–HS', and the operation of the latter will be understood from the above comments.

Register B (FIB. 2C) includes relays B1 through B7, relay BS and relay B. The coils of relays B1 through B7 are connected to LN through back EB$a$. Thus when EB is actuated, Register B is reset. The actuation of the coils B1 through B7 is controlled by relay DB through front DB$f$ through DB$l$, respectively. The coils are adapted to be connected selectively to the conductor LP through DB$f$ through DB$l$, respectively, and through selected contacts D$a$ through D$g$ which define the magnitude of the operation of the Controlled System as a binary number. The contacts D$a$ to D$g$ may be the contacts of a Digi-Coder converter which converts a voltage derivable from the Controlled System into a binary number. Such a converter may be bought from Fischer & Porter Co. of Hatboro, Pa. Thus, with DB actuated, the actuation of relays B1 through B7 define the operation of the Controlled System as a binary number. The actuated coils B1 through B7 are locked in through front B1*i* through B7*i*, respectively.

Relay B5 is of the type which pulls in instantaneously on being energized but drops out after a predetermined time delay when its energizing circuit is open. The coil of this relay is connected between conductors LP and LN through back B1*a* through B7*a*. Thus, when Register B is recording a magnitude, BS is deenergized, the coil of B is connected between conductors LP and LN through back B5*a*. Thus, B is energized when Register B is carrying a record.

Register A (FIG. 2C) includes relays A1 through A7, AS, and A. The coils of relays A1 through A7 are connected to conductors LN through back EA*a* so that when relay EA is actuated, Register A is cleared. The coils of the relays A1 through A7 are connected to conductor LP when relay DA is actuated through back A*l* through A*r*, front DA*f* through DA*l* and the contacts D*a* through D*h*, respectively. When DA is actuated the relays A1 through A7 thus record a number corresponding to the selective actuation of the contacts D*a* through D*h*.

The coils A1 through A7 once energized are adapted to be locked in through front A1*h* through A7*h*, respectively. The coils of A1 through A7 are also adapted to be energized with relay CA actuated through corresponding contacts C1*c* through C7*c*. Thus, a magnitude may be transferred from Register C to Register A by actuation of relays CA. Relay AS is similar to relay BS and is similarly connected. Relay A is similar to relay B and is similarly connected.

Register C (FIG. 2B) includes relays C1 through C7, relays CS and relay C. The coils of relays C1 through C7 are adapted to be connected through front B1*h* through through B7*h*, respectively, front BC*c* and back EC*a*, between conductors LP and LN. With BC actuated the magnitude in Register B may be transferred to Register C. With EC actuated Register C is cleared. Relays CS and C are similar and similarly connected to relays AS and A and BS and B.

The Evaluate Unit (FIG. 2D) includes relays TD, TDS, EV, UF, US and CM. The coil of relay TD is adapted to be connected between conductors LP and LN through front A*e* or C*e*, front B*c* and ST*j*. The coil of relay TDS is connected between conductors LP and LN through back TD*a*. This coil is shunted by a plurality of capacitors and resistors and when its energizing circuit is opened by the actuation of relay TD, relay TDS drops out after a predetermined time interval. The coil EV is connected between conductors LP and LN through back TDS*a*. The coil of US is adapted to be connected between conductors LP and LN through front EV*c*, back EA*b* and an array of front and back contacts, A1*f* through A6*f* and B1*e* through B7*e* and A1*e* through A7*e*, A1*g* through A6*g*, and B1*g* through B6*g*, respectively. The latter contacts are so connected that if the number recorded in Register B is greater than the number recorded in Register A relay US is actuated.

Thus, assume the number in Register A to be 2 and in B to be 3. Then A6 and B6 and B7 are actuated. US is then actuable through back A7*e*, front B7*e*, front B6*f*, front A6*f*, and back B5*g*, A5*g*, B4*g*, A4*g*, B3*g*, A3*g*, B2*g* and A2*g*, B1*g*, A1*g* and E*as* and front EV*c*. US is then locked in through front US*q* and back UF*u*. If the number 3 is recorded in Register A and the number 2 in Register B, then B6 and A6 and A7 are actuated and US cannot be actuated.

The coil of UF (FIG. 2c) is connected between LP and LN through front EV*b* and back BC*a*, and an array of front and back contacts of A1 through A7 and B1 through B7 analogously to US, but in this case, the array of series-connected contacts A1*d*, B1*d* through A7*d*, and A1*h*, B1*h* through A7*h*, B7*h* include contacts of the seventh relays A7 and B7 at the end of the series array; that is, front B7*h* and back B7*d* are connected directly to conductor LP. The difference in the connections arises from the necessity that UF is to be actuated either when the records in Register A and Register B are equal or when the record in Register A exceeds that in Register B. Thus, assume that Registers A and B both record 32. Under such circumstances A2 and B2 are the only actuated relays. UF is then actuated through the conductor connecting back B7*h* and front B7*d* to LP, back B7*h*, A7*h*, B6*h*, A6*h*, B5*h*, A5*h*, B4*h*, A4*h*, B3*h*, A3*h*, and front B2*d*, A2*d*, and back B1*d*, A1*d* and back BC*a* and front EV*b*. If Register A records 32 and Register B 31, A2 and B3 through B7 are actuated. In this case UF is actuated through front A2*b*, back B2*c*, back B1*h*, back BC*a* and front EV*b*.

The coil of relay CM is adapted to be connected between LP and LN through front US*e* in the event of a success. This coil is also adapted to be connected between LP and LN through back RV*c*, and fronts NT*c* or DM*b* or front FC*r*.

The Register Release Unit (FIGS. 2D and 2E) includes the relays EA, EB and EC. When these relays are actuated, associated Registers, respectively, A, B and C are reset. The coil of EA is adapted to be connected between conductors LP and LN through front ST*k* and back DA*a*; thus actuation of ST operates to clear Register A at the start of an optimalizing process. The coil of EA is also adapted to be connected between conductors LP and LN through the following circuits:

Back CA*c*, front C*c*, front A*h*,
Front FC*d*, front UF*q*, front A*t*,
Back A*b*, front DA*b*, back UF*p*, front FCT*a*, front UF*q*, front A*t*,
Front ST*c*, back A*a*, back B*a*, back UF*p* front FCT*a*, front UF*q*, front A*t*.

The coil of EB is adapted to be connected between conductors LP and LN through front ST*b*. This connection clears Register B at the start of an optimalizing operation. The coil of EB is also adapted to be connected between LP and LN through the following combinations of contacts:

Front UF*s*, front CM*t*, front B*f*, back FC*e*, back F8A*d*, back A*i*, front CA*d*,
Front ST*k*, back A*j*, front C*d*,
Back CA*c*, front C*c*, front A*h*, back DA*a*, back A*j*, front C*d*,
Front FC*d*, front UF*q*, front A*t*, back DA*a*, back A*j*, front C*d*,
Back A*b*, front DA*b*, back UF*p*, front FCT*a*, front UF*q*, front A*t*, back DA*a*, back A*j*, front C*d*,
Front ST*c*, back A*a*, back B*a*, back UF*p*, front FCT*a*, front UF*q*, front A*t*, back DA*a*, back A*j*, front C*d*.

The coil of relay EC is adapted to be connected between conductors LP and LN through front ST*e* or back B*e* and front A*s*.

The B–C Register Transfer Unit (FIG. 2D) includes a relay BC. The coil of this relay is adapted to be connected between conductors LP and LN through fronts US*h*, EV*e*, CM*j*.

Figure 2D:
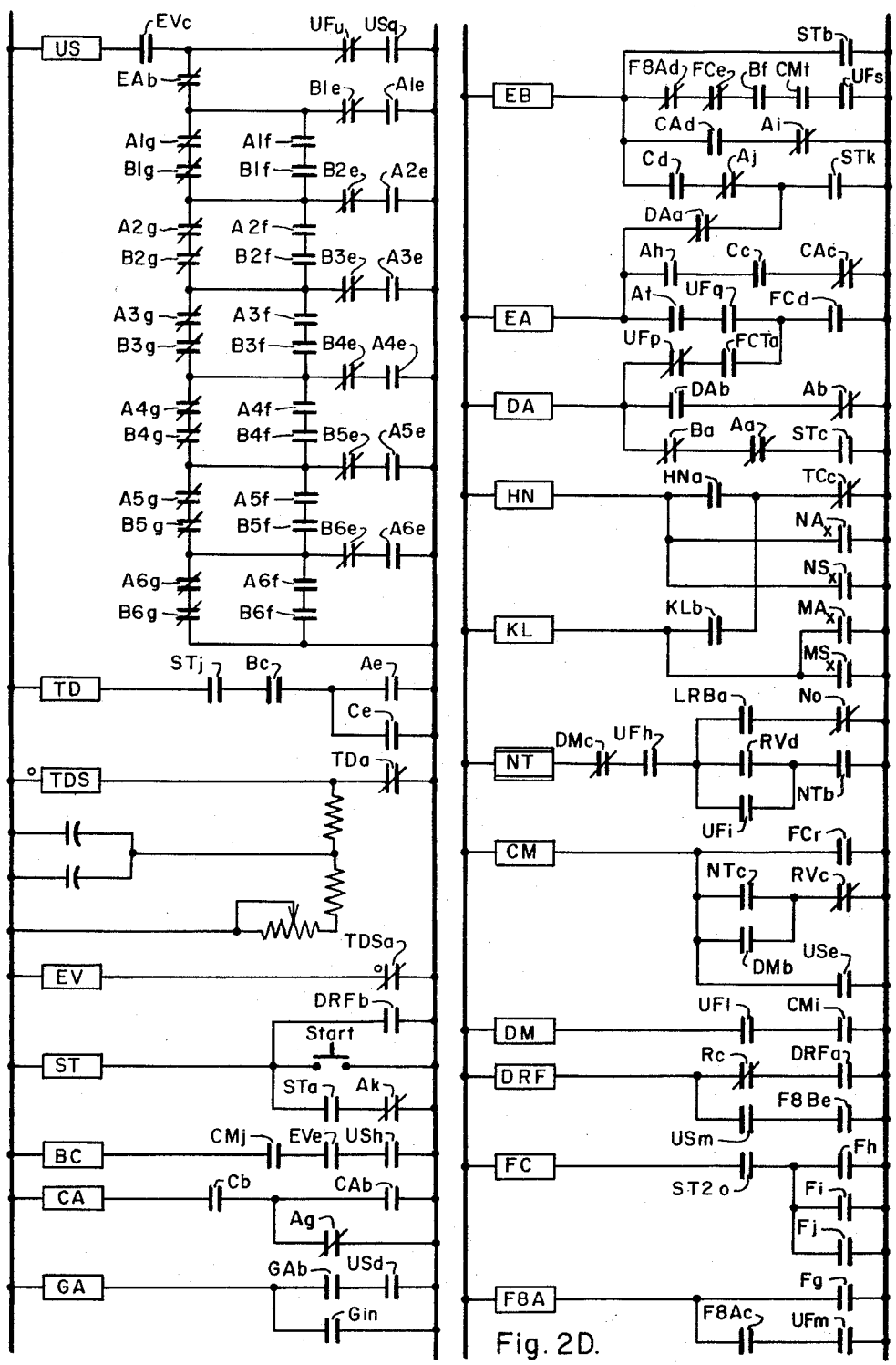
Figure 2E:
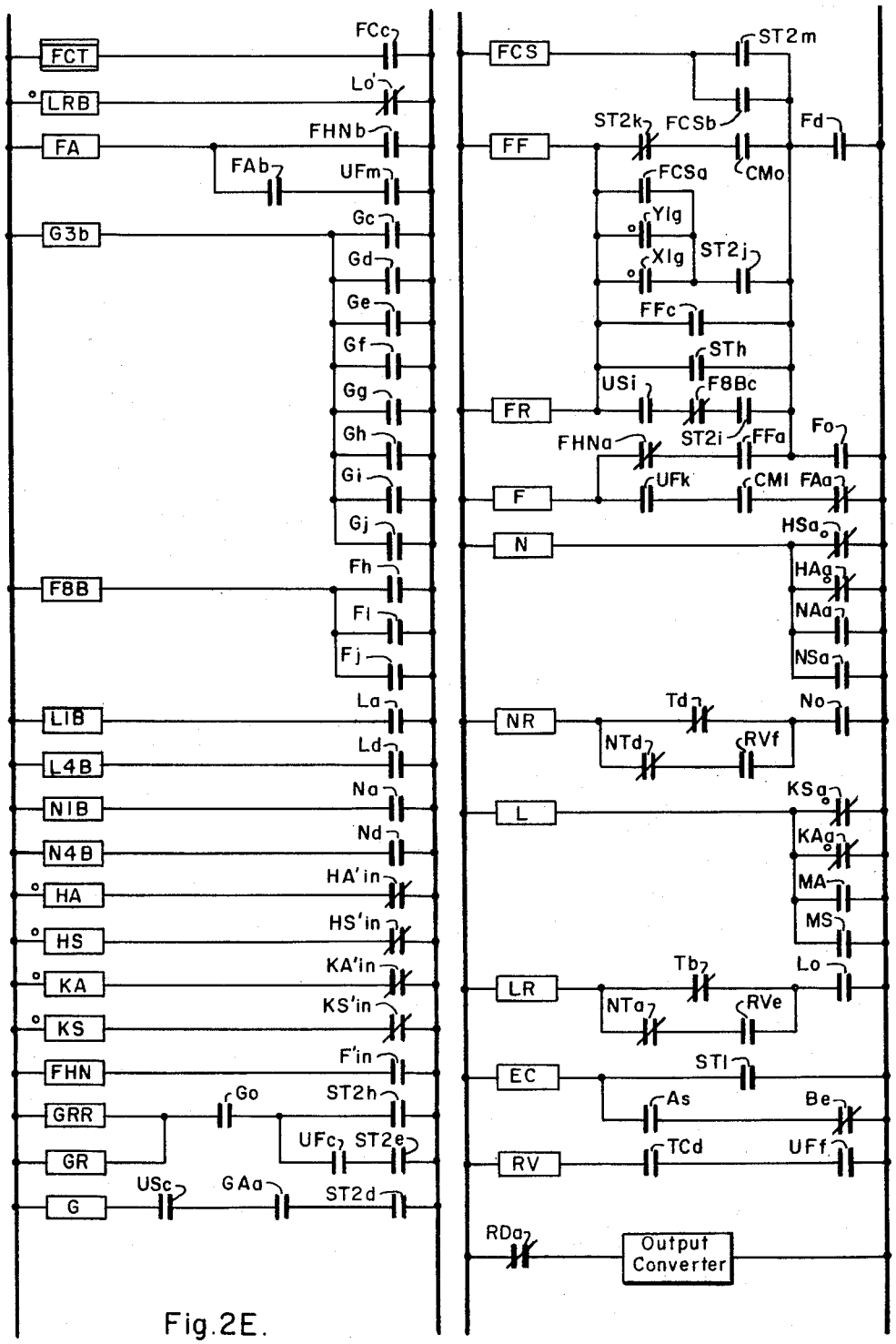
Figure 2F:
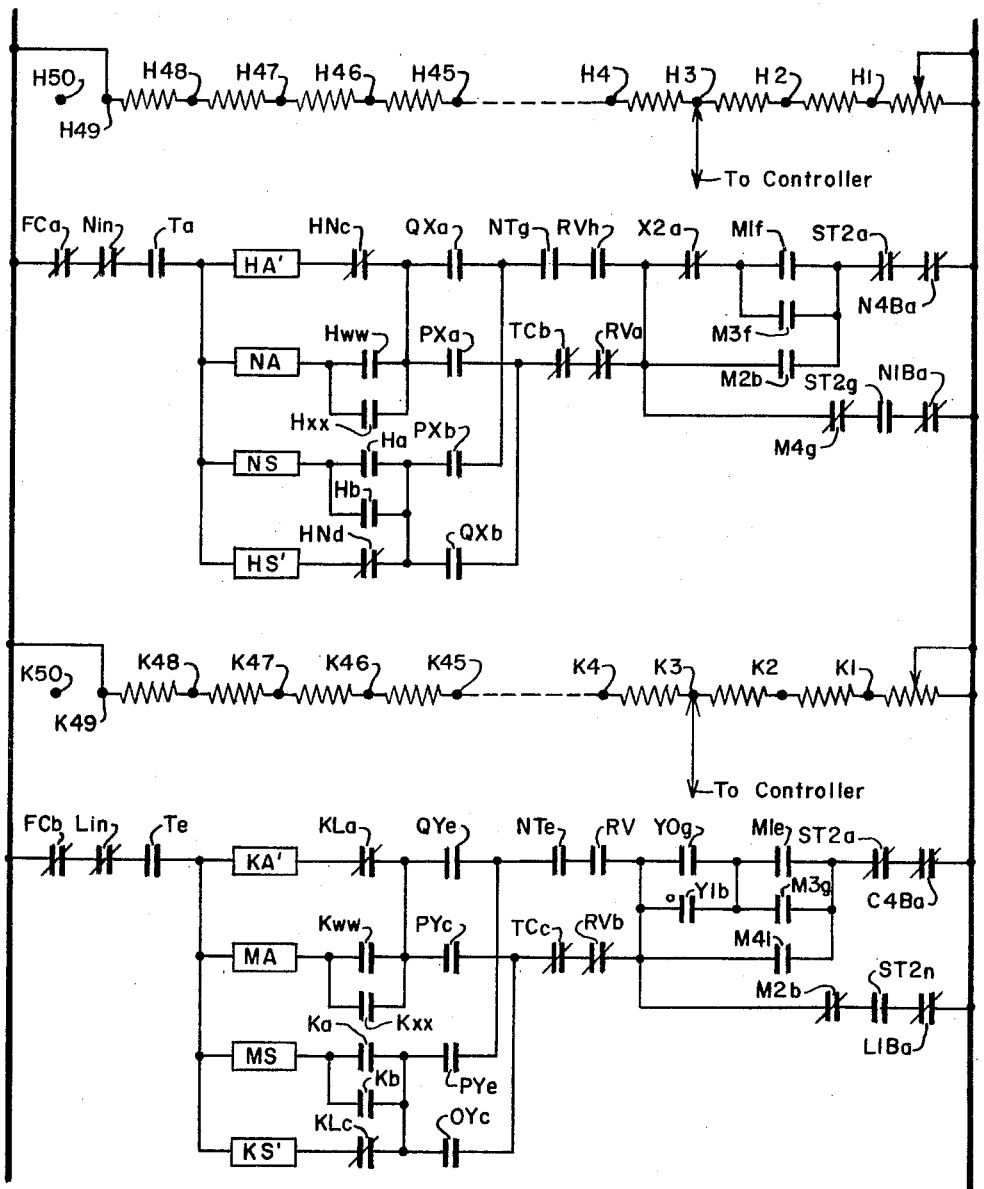

The Return Unit includes the relay NT, DM, RV and LRB (FIGS. 2D, 2E). Relay NT is of the type which drops out a predetermined interval after the current flow through its coil is interrupted. The coil of NT is adapted to be connected between conductors LP and LN through a back off-normal N*o*, of minor counter N, front LRB*a*, front UF*h*, and back DM*c*. This coil is locked in through front NT*b*, front RV*d* or front UF*i*, front UF*h*, and back DM*c*. The coil of RV is adapted to be connected between conductors LP and LN through front UF*f*, and back TC*d*.

The coil of the relay DM is adapted to be connected between conductors LP and LN through front CM*i* and front UF*l*. The coil of LRB is connected between conductors LP and LN through off-normal back L*o* of minor counter L.

The C–A register Transfer Unit (FIG. 2D) includes relay CA. The coil of CA is adapted to be connected between conductors LP and LN through front CA*b* and front C*b* or through back A*g* and front C*b*.

The B Register Setting Unit (FIG. 2B) includes relays TC and DB. The coil of relay TC is adapted to be connected between conductors LP and LN through the following circuits:

Front N*d* or L*d*, back ST2*b*, back EV*a*, back CM*c*
Front N*a* or L*a*, front ST2*c*, back EV*a*, back CM*c*
Front N*d*, or L*d*, back ST2*b*, back FF*d*, front F*hj* or F*j*

Back EV*a* and back CM*c* are shunted by front NT*h*. The coil of TC is adapted to be locked in through front TC*e*. It is seen that in state 1 TC is actuable on the fourth operation of minor counters N or L, in state 2, on the first operation of minor counters N and L.

The coil of DB is adapted to be connected between conductors LP and LN through back CM*a*, back B*b*, front A*d* and front TC*a*. Actuation of TC thus causes DB to be actuated if there is a record in A Register but none in B Register. DB permits the record to be placed in B Register. The timing of the placing of the record following the change of the Controlled System is controlled by the time delay relay RD.

The Success Counter Unit (FIG. 2E) serves to count successes with the apparatus in state 2. This Unit includes a minor counter G–GR having an actuating coil G and a reset coil GR. In addition this Unit includes the relays GRR, G3B and GA. Coil G is adapted to be connected between conductors LP and LN through front ST2*d*, back GA*a*, and front US*c*. The coil of GR is adapted to be connected between conductors LP and LN through back ST2*h*, or front ST2*e*, and front UF*c* and the off-normal front G*o* of G–GR. The coil of GRR is in parallel with GR. The coil of GA (FIG. 2D) is adapted to be connected between conductors LP and LN through front G*in* which is closed and reopened on each actuation of coil G and is locked in between conductors LP and LN through front US*d* and front GA*b*. Thus, GA cooperates with G to produce counting. The coil of G3B is adapted to be connected between conductors LP and LN through any of the contacts G*c* or G*i*. G3B is thus connected between LP and LN on the third count of G.

The Failure Counter Unit (FIG. 2E) includes the minor counter F–FR having an actuating coil F and a release coil FR. In addition, this Unit includes the relays FF, FHN and FA. The coil of F is adapted to be connected between conductors LP and LN through back FA*a*, front DM*l*, front UF*k*, and also through front off-normal F*o*, front FF*a*, back FHN*a*. The coils of FF and FR are adapted to be connected between conductors LP and LN through front F*d*, front CM*o*, back ST2*k*, and through F*o* and a plurality of the following parallel circuits:

Front ST2*j* and front FCS*a*
Front ST2*j* and front Y1*g*
Front ST2*j* and front X1*g*
Front FF*c*
Front ST*h*
Front ST2*i*, back F8B*c*, front US*i*

The coil of FHN is adapted to be connected between conductors LP and LN through front F*in*, which is closed and reopened on each count of F–FR. The coil of FA is adapted to be connected between conductors LP and LN through front FHN*b* and to be locked in through front FA*b* and front UF*l*. FHN and FA cooperate to produce the counting of F–FR.

It appears desirable to digress for a moment and describe the function of these various circuits. The circuit including front F*d* has the effect of actuating FF and resetting the Counter F–FR. The actuation of FF sets the apparatus in state 2 through FF*b*. The counter F–FR is reset if the apparatus is set in state 2 before four counts of F have been completed. It is to be understood that the apparatus could be set in state 2 when both X and Y are in status 2 (X2*i*, Y2*h*). Fronts X1*g* and Y1*g* prevent FF from operation if either X or Y is in status 1 and the apparatus is in state 2. FF*c* is a lock-in contact for FF. ST*h* resets Counter F–FR at the beginning of an operation and the path F*o*, ST2*i*, F8B*c*, US*i*, reset Counter F–FR if there is a success before eight failures have been counted.

The Drift Unit (FIGS. 2D, 2E) includes relays FC, FCT, F8A, F8B and DRF. The coil of F8A (FIG. 2D) is adapted to be connected between conductors LP and LN through F*g* and is adapted to be locked in through front UF*m* and front F8A*c*. This relay is actuated following seven failures with the apparatus in state 2. The coil of F8B is adapted to be connected between LP and LN through fronts F*h*, F*i* or F*j*. F8B is actuated following the eighth failure with the apparatus in state 2 and operates to set the apparatus for drift.

The coil of FC (FIG. 2D) is adapted to be connected between conductors LP and LN through front ST2*o* and either of fronts F*h*, F*i* or F*g*. FC is then actuated following the eighth failure in state 2. Back contacts F8A*d* and FC*e* prevent E*b* from being energized and thus prevent Register B from clearing after the seventh failure in state 2. FC at contact FC*d* causes relay EA to be actuated thus clearing Register A following the eighth failure in state 2.

Relay FCT is of the type which is actuated immediately on being energized but drops out only after a short predetermined time delay when its coil is deenergized.

The coil of FCT is adapted to be connected between conductors LP and LN through front FC*c*. FC and FCT at contacts FC*d* and FCT*a* cause DA to be actuated during drift. This causes records of the operation of the System to be repeatedly recorded in Register A in drift following succeeding failures if they continue to occur. The interval between successive samplings in drift is longer than the normal interval for setting Register A or Register B because back F8B*g* is open.

The relay DRF (FIG. 2D) is adapted to be connected between LP and LN through front F8B*e* and front B*e* and front US*m*. This relay is locked in through front DRF*a* and back R*c*. The relay DRF is actuated on the occurrence of a success following the eighth failure. This relay at contact DRF*b* then actuates ST to start an entirely new optimalizing operation.

Stand-By

In the stand-by condition of the apparatus, the conductors LP and LN are energized and the apparatus is ready for operation. In this condition, button SW (FIG. 2D) is open and relay ST is deenergized. Relays X1 and Y1 (FIG. 2A) are then energized and the other relays of the Status Polarity Unit are deenergized.

Registers B and A would be cleared at the start of any operation by the closing of fronts ST*b* and ST*k* (FIG. 2D). It may then be assumed that these Registers are cleared. The relays of Modulo Unit are deenergized as is also relay T of the Counter Control Unit. Relay DB is deenergized because Register A is cleared. Relay NC (FIG. 2B) is actuated. Relay BC is deenergized and Register C is cleared. Since Registers A, B and C are cleared, relay AS, BS and CS are energized and relays A, B and C are deenergized. Since relays DA and DB are deenergized, relay R is deenergized. Relay RC is energized as is also relay RD (FIG. 2C). The Output Converter (FIG. 2E) is then disabled because back RD*a* is open.

Relay TD is deenergized because Registers A, B and C are cleared. Relay TDS is then energized and relay EV deenergized. Relays US and UF are then deenergized. Relay CA is deenergized because Register C is cleared. The major counters are deenergized at fronts T*a* and T*e* among others. Relays HA and HS, KA and KS are then energized through backs HA'*in*, HS'*in*, KS'*in*, KS'*in*. Minor counters L–LR and N–NR (FIG. 2E) are then in their zero settings.

At the start of an operation the major counters and POTX and POTY should be set in accordance with the properties of the Controlled System. It may be that a propitious starting point for the Controlled System is known. Under such circumstances the counters may be initially set so that POTX and POTY impress the voltage corresponding to this point. Under other circumstances the major counters may be so set that POTX and POTY are at their central positions. The latter setting would permit a substantial range of variation either with positive or with negative increments. As applied to the above-described System in which, for example, the rate of flow of ethyl-benzene and steam are controlled, the setting of the Major Counters essentially determines the initial operation of the valves through which the ethyl-benzene and the steam are supplied. If there is a predetermined propitious relationship between the rates of flow, the counters HA′–HS′ and KA′–KS′ may be set at different points corresponding to this relationship. The valves would then be initially opened by electromagnetic means, for example, to the extent determined by the initial settings. Since the major counters are at intermediate setting, HN and KL are deenergized.

NT (FIG. 2D) is deenergized because UF is deenergized. DM is deenergized because UF is deenergized. CM is deenergized. Counter G–GR is in the zero setting because US and ST2 are deenergized. Counter F–FR is in the zero setting because UF is deenergized. Relays FF and GRR are deenergized because GR and FR are deenergized.

If G–GR were off-normal, GR would be actuated through ST2*h* and G*o* to reset it. If F–FR were off-normal FR would be actuated through F*o* and ST*h* on the closing of switch SW. Since F–FR is in the initial setting DRF, FC, F8A, FCT, F8B, FHN and FCS are deenergized. GA is deenergized because G*in* is open.

*Operation*

The operation of the apparatus will be explained with reference to FIG. 3, which is a contour graph showing the relationship between the variables X and Y and the operation of the Controlled System. Referring to the above-described System for producing mono-styrene, it may be assumed that Y represents the flow of ethyl-benzene and X represents the flow of steam. Y is plotted vertically and X horizontally.

FIG. 3 shows in the left hand and to an extent in the right hand quadrant a family of irregular closed curves which are labeled 70 through 10. These curves define lines of equal magnitude of operation of the Controlled System. The highest magnitude represented by curves is the curve labeled 70 and the lowest is the curve labeled 10. The peak magnitude lies within the curve labeled 70. It is desired in operating the apparatus that starting with the System at an arbitrary point labeled Start in FIG. 3 the point of maximum operation of the Controlled System be reached in a series of moves. The apparatus in accordance with this invention carries out this optimalizing operation automatically.

With the apparatus at the point Start then the push button SW is closed. Relay ST is then actuated and locked in through front ST*a* and back A*k*. The actuation of relay ST causes relays X1 and Y1 to be deenergized at ST*d* and relays X0 and Y0 to be energized at ST*e* and ST*f* and to be locked in as shown. The actuation of relay ST also causes DA to be energized through front ST*c* and backs A*a* and B*a*. R is then energized through DA*d*, RC deenergized and RD deenergized. After a predetermined interval, the Output Converter is enabled through RD*a*. With DA actuated, Register A is also enabled and records the magnitude of operation of the Controlled System at the Start point. With a record at Register A, relay M is actuated through backs CM*b*, front Y0*a*, front X0*a* and front A*d*. The actuation of ST also actuates PX through front ST*m* and PY through front ST*n*, and these relays are locked in through front PX*a* and front PY*a*, respectively. The apparatus is now set to produce positive increments.

With a record in A, relay ST is deenergized at back A*k*. The resetting of relay ST and the resulting closure of ST*d* does not reenergize relays X1 and Y1 because now back X0*e* and back Y0*e* are open. With ST deenergized back ST*i* is closed and relay M1 is energized through front Y0*b*, back M2*a*, front X0*b*, front M*b* and front M*a*. Relay M1 is locked in through back M2*c* and front M1*b*. The apparatus is now in modulo 1 in which increments ΔX and ΔY are added to the settings at the Start point.

The actuation of M and M1 causes T to be actuated through back PC*a*, back F8B*a*, front M*c*, front M1*a*, front Y0*c*, front X0*c*, and back CM*a*. HA′ is now actuated through back N4B*a*, back ST2*a*, front M1*f*, back X2*a*, back RV*a*, back TC*b*, front PX*a*, back HN*c*, front T*a*, back N*in*, back FC*a*. Because of the cooperation of counter N–NR the actuation of HA′ continues for four counts until N4B*a* opens. KA′ is similarly actuated for four counts until L4B*a* opens. The potentiometers POTX and POTY are then advanced so that positive increments ΔX and ΔY are added to the Controlled System. The System is then set to a new point represented graphically by the point at the end of the line labeled 1 in the direction of the arrow.

When the fourth points are reached fronts N*d* and L*d* in circuit with the coil of TC are closed and TC is actuated. DB is then actuated through back B*b*, front A*d*, and front TC*a*. R and RC are then actuated and RD drops out after a predetermined time interval enabling the Output Converter. Since DB is at this time actuated, once the Output Converter is enabled the operation of the Controlled System is recorded in Register B. Back B*b* is then opened and DB deenergized resetting R, RC and RD. With records in Registers A and B, TD is actuated through front A*e*, front B*c* and back ST*j*. TDS then drops out after a time interval and EV is actuated. The actuation of EV resets TC. The actuation of EV also sets up relays US and UF to compare the magnitudes in Registers A and B. It is assumed that the trend of operation represented by the contour lines of FIG. 3 continues. Under such circumstances move 1 is a failure and relay UF operates.

When UF is actuated, RV is actuated through back TC*d* (TC is deenergized) and front UF*f*. Actuation of RV actuates NR and LR, the former through back NT*d*, front RV*f* and front N*o* and the latter through back NT*a*, front RV*e* and front L*o*. The minor counters N–NR and L–LR are reset. Now NT is actuated through back DM*c*, front UF*h*, front LRB*a* and back N*o* and locked in through back DM*c*, front UF*h*, front RV*d*, and front NT*b*. Front UF*i* also closed shunts RV*d*. With RV and NT actuated relay TC is connected to conductors LP and LN through front NT*h* but remains deenergized because N*d* and L*d* are now open. HS′ is actuated through back N4B*a*, back ST2*a*, front M1*f*, back X2*a*, front RV*h*, front NT*g*, front PX*b*, back HND, front T*a*, back N*in*, back FC*a*. The actuation of HS′ returns major counter HA′–HS′ a series of steps determined by N–NR. The return continues until back N4B*a* is opened. Similarly, counter KA′–KS′ is returned four steps. This return of HS′ and KS′ resets the Controlled System to Start. During the counting NR and LR remain deenergized because back NT*d* and back NT*a* are open. When CM is energized T is deenergized and N and N–NR and L–LR are reset through back T*d* and back T*b*, respectively. After the fourth return count, N*d* and L*d* are actuated actuating TC (through NT*h*). This deenergizes RV. NT remains locked in through front UF*i*. The deenergization of RV causes CM to be actuated through back RV*c* and front NT*c*. DM is now actuated through front UF*l* and front DM*i*, and shunts out NT*c*. NT is now deenergized at back DMc, but contact NTh remains closed because NT drops out only after a predetermined short time delay. Thus, TC remains actuated in spite of the deenergization of NT.

The actuation of CM has a number of results. In the Status Polarity Unit, XF is actuated through front UFt, front CMu, front X0f, front M1n and back Y1f. Also YF is actuated through front UFn, front CMq, front Y0d, front M1c and back X1b. PX1 is then actuated through front PXc and front XFd. This prepares a circuit through PX1b for actuating QX when YF is deenergized. In the same manner a circuit is prepared for QY through PY1d when YF is deenergized. In addition, PC is actuated through fronts YFb, PX1c and X0i. When CM is energized, M is deenergized. M11 is then energized through front M1d, back Me, and front CMe and is locked in through front M11a. M2 is then conditioned to be energized through back M3c and front M11b. When CM is energized F is energized through front UFR, front CMe and back FAa counting one failure. The actuation of CM also causes EB to be energized through back F8Ad, back FCe, front Bf, front CMt, front UFs. EBa is then opened and Register B is cleared. The clearing of Register B results in the opening of front Bc so that TD becomes deenergized, TDS becomes energized and EV becomes deenergized, deenergizing UF. NTh now reopens and TC becomes deenergized. Since UF is now deenergized, RV remains deenergized.

The deenergization of UF deenergizes DM and CM is deenergized. The deenergization of CM resets XF and YF and QX and QY are energized setting the apparatus for negative increments —ΔX and —ΔY.

The apparatus is now set to operate in modulo 2. When CM is deenergized CMu and CMq open deenergizing XF and YF. PC is in turn deenergized. The deenergization of XF and YF causes QX and QY to be energized through the former through front PX1b and back XFc and the latter through front PY1d and back YFd. The apparatus is now set for negative increments.

In addition, when CM is deenergized M is reenergized through back Mb, front Y0a, front X0a, and front Ad. M2 is now energized through front Ma, front M11b, and back M3c. M1 is now deenergized because back M2c is open. M11 is deenergized when M1 is deenergized. The apparatus is now set in modulo 2.

Relay M11 drops out only after a predetermined delay. Thus, when CM is deenergized and M energized causing M2 to be energized and M1 to be deenergized, M11 remains actuated when the operations of M2 and M1 are complete. T is then energized through back PCa, back F8Ba, front Mc, back M1m, front M2j, front M11b, and back CMa. The energization of T results in the operation of major counter HA'–HS' through back N4Ba, back ST2a, front M2b, back RVa, back TCb, front QXb, back HNd, front Ta, back Nin, back FCa. Major counter KA'–KS' is not operated since there is no closed modulo contact in this circuit.

By the cooperation of minor counter N–NR major counter HA'–HS' operates over four counts. Back N4Ba then opens stopping the counting. TC is now actuated actuating DB. This in turn actuates R and RC dropping out RD and enabling the Output Converter. The Controlled System has now been set in a new position by an increment —ΔX represented by the line labeled 2 in FIG. 3. In this case the increment is negative. The increment is in the direction of increasing magnitude of operation and the new move is then successful. Relay US is then actuated.

The actuation of relay US closes contact USc to actuate CM. The relay M is then deenergized. Contact MA is opened but relay M2 remains energized through front M2e. The actuation of relay CM also actuates relay M21 on the closing of front CMf and relay M21 is locked in through front M21a. The actuation of CM also deenergizes relay T. Contact Td is then reclosed actuating coil NR and resetting minor counter N–NR.

The actuation of US and CM also closes fronts USh and CMj and since EVe is also closed relay BC is actuated and contact BCc is closed. This causes the transfer of the record in Register B to Register C through the selected closed contacts B1h through B7h. The recording in Register C causes relay C to be energized closing front Cc and since Ah is already closed EA is actuated to clear Register A. On the clearing of Register A, front Ah is reopened resetting relay EA. Also on the clearing of Register A, back Ag is closed and since front Cb is already closed CA is actuated. This closes front CAe and the record in Register C is transferred to Register A through the selected contacts C1c through C7c. In addition, on the clearing of Register A prior to the new recording, back Aj is reclosed actuating relay EB and clearing Register B. On the clearing of Register B, back Be is reclosed. After the new record is placed in Register A, front As is closed actuating EC and clearing Register C. The clearing of Register C results in the opening of front Cb resetting relay CA. Relay EB is then reset by the opening of front CAd.

The actuation of relay EA during the transfer of the record from C to A causes the opening of back EAb resetting US. With US reset, CM is deenergized. The deenergization of CM actuates relay M and it locks in through back CMb, front Mi and back STg. At this time M21 is actuated. Relay M3 is then actuated through back M4c, front M21b and front Ma. The actuation of M3 causes M3c to open resetting M2. This deenergizes M21 but the latter remains actuated for a short time interval after it is deenergized. The actuation of M3 also opens back M3a and X0 is deenergized. This recloses back X0e actuating X1 so that X is now in status 1. Front X0h also opens but Y0 remains actuated through back M1a. Y then continues in status zero.

The actuation of M also closes front Mc and T is actuated through back PCa, back F8Ba, front Mc, back M2k, front M31, front M21d (which has not yet dropped out) and back CMa. HS' is now energized through back N4Ba, back ST2a, front M3f, back A2a, back RVa, back TCb, front QXb, back HNd, front Ta, back Nin and back FCa. KS' is similiary actuated. The major counters now cooperate with minor counters N–NR and L–LR to produce four counts. When the four counts have been produced HS' and KS' are deenergized and TC is energized. DB and R are energized and RC and RD are deenergized so that a record is placed in Register B. TD is then energized and TDS deenergized and EV energized. This again enables the Evaluate Unit and in addition TC is deenergized.

A move corresponding to the line labeled 3 in FIG. 3 has now been completed. This move is a failure and the above-described operations returning the major counters to their initial positions, clearing Register B and resetting the apparatus for a new move are carried out. During these operations CM is actuated and front CMu in circuit with the coil of XF and front CMq in circuit with the coil of YF are closed. Front CMu has no effect since X is in status 1 and X0F and X2K are open. The closing of CMq causes YF to be actuated and this ultimately results in the deenergization of QY and in the energization of PY so that the apparatus is set for a negative ΔX but a positive ΔY.

During the evaluate operation, front UFk and front CMl were closed. F was then actuated to produce one failure count. Minor counter F–FR has now counted two failures The apparatus is next set in modulo 4 and the fourth move represented by line 4 in FIG. 3 is made. This move changes the setting of the System by positive ΔY and is successful. The apparatus is then returnd to modulo 1 and a fifth move adding a positive Y increment and a negative X increment is made. This move is also successful.

While the apparatus is in modulo 1, back M1a is opened and Y0 becomes deenergized. Y1 is then energized setting Y in status 1. One of the significant features of this setting is that now in the event of a failure, neither ΔX nor ΔY changes polarity.

The apparatus is then next set in modulo 2 and another move adding a negative X increment is made. This move is successful. The seventh move represented by the line labeled 7 in FIG. 3 adds a negative X increment and a positive Y increment and is also successful.

The eighth move in modulo 4 adds a positive Y increment and is unsuccessful. Minor counter F–FR has now counted three failures.

The failure of the eighth move takes place in modulo 4 with Y in status 1. The operation of the Evaluate Unit then causes CSY to operate through front UFp, front CMs, front Y1d and front M4j. Y11 is then energized through front Y1e and front CSYe and is locked in through front Y11d. When the apparatus is reset and relay CM deenergized, Y2 is then energized through back STd, back CSYc, front Y11c and back G3Bb. Y1 is then deenergized on the opening of back Y2e. Y is then in status 2. With Y in status 2, there is no path through KA' or KS' in modulo 1 or modulo 3. The succeeding move in modulo 1 then only introduces an X increment. Since X is still in status 1 back X2a is still closed.

After the eighth move the Controlled System is now returned to the setting following move 7 and a ninth move is made. This move adds a negative X increment and is successful.

The ninth move then adds an X increment as represented by the line labeled 9 in FIG. 3. This move is successful. The apparatus is in modulo 2 for the tenth move and this adds another X increment. This move is unsuccessful.

The operation of the Evaluate Unit during move 10 results in the actuation of CSX through front UFn, front CMr, front X1c and front M2h. X2 is then actuated and the apparatus is in status 2 both for X and for Y. This sets the apparatus in state 2 since relay ST2 is actuated through back STo, front Y2h, and front X2i. In addition, the apparatus is set in state 2 because minor counter F–FR has counted four failures actuating FF. In addition, FR is actuated and the minor counter F–FR is reset.

With the apparatus in state 2, front ST2g and front ST2b are actuated and back ST2a and back ST2u are open. The Major Counter Unit now is set so as that the operation of Minor Counter Unit is through N1b and L1b. The latter relays are actuated on the first count. Thus, the major counters produce only one count on each actuation of relay T.

Since the tenth move is a failure the apparatus is reset to the terminal of the ninth move. The moves are now in state 2.

For the eleventh move the apparatus is in modulo 3 with QX and PY actuated. During this move HS' is actuated through back N1Ba, front ST2g, back M4g, back HVa, back TCb, front QXb, back HNd, front Ta, back Nin and back FCa. KA' is similarly actuated. Increments in X and Y having a magnitude one-quarter of the increments originally added are now added to the setting of the Controlled System. Thus, the eleventh move is produced. This move is a failure and the setting is returned to the setting of move 9. During unsuccessful move 11, the minor counter F–FR counts one failure.

During the operation involving the eleventh move the Evaluate Unit causes both XF and YF to operate and both the X and Y increments are reversed. The twelfth move adds the smaller Y increment to the setting of the System and this move is successful. The successful twelfth move causes FR to be actuated through front Fo, front ST2i, back F8Bc, and front USi. Minor counter F–FR is then reset. In addition, FF is also energized, but this has no effect.

The thirteenth move adds a postive Y increment to the setting and is a failure. The fourteenth move is in modulo 2 and is successful. The fifteenth move is in modulo 3 and is unsuccessful. During this latter move a positive Y increment and a negative X increment were added. A change in polarity for both then takes place so that during the sixteenth move a negative Y increment is added, and this move is successful so that minor counter F–FR is reset. The seventeenth, eighteenth, nineteenth, twentieth, twenty-first, twenty-second, twenty-third and twenty-fourth moves are unsuccessful. The twenty-fourth move coincides with the sixteenth move. During the unsuccessful moves 17 through 24, the wipers of Counter F count, one for each move. During the twenty-third move F8A is actuated. This opens F8Ad and prevents actuation of EB following the occurrence of a failure during the twenty-fourth move.

Following the twenty-fourth move F8B, FC and FCT are actuated. On the actuation of F8B, F8Ba is opened preventing further actuation of T and thus any further changes in the setting of the Controlled System through the major counters. The System is now set for drift. The actuation of FC causes EA to be energized through front FCd, front UFq, and front At and Register A to be cleared. Once Register A is cleared At is opened resetting EA. Register B is not cleared because F8A was open when UF was actuated, and it is held open following the eighth count of F–FR by FC which is open. In addition, when UF resets after the twenty-fourth move, relay DA is energized through front FCd, front FCTa and back UFp. R is then energized, RC deenergized and RD deenergized. This enables the Output Converter and Register A receives a record of the setting of the Controlled System at the instant of the enabling. Since F8Bg is at this time open, the deenergization of RD takes a substantially longer time interval than during the normal optimalizing operation as described above.

When a record is now recorded in Register B, relay TD is energized through front Ae, front Bc and back STj. Relays TDS is now deenergized and relay EV energized to enable the Evaluate Unit. If the Evaluate Unit indicates a failure the apparatus is reset. In this case DA is deenergized by the energization of relay UF and the opening of UFp and Register A is cleared by the closing of front UFq. The above-described sampling process is then again repeated by the reenergization of DA after UF is deenergized and back UFp recloses. The interval between the two samplings is determined by the timing network including the coil of relay RD. The sampling may continue in this manner for a reasonable time.

If, during the sampling time a success occurs, relay DRF is energized through front USm and front F8Be, and is locked in through back RC and front DRFa. The energization of relay DRF causes relay ST to be energized through front DRFB. This resets the apparatus to zero status (back STd) and the first state (back ST0). The above-described optimalizing process, beginning with the actuation of ST, may now be repeated. During this process DRF is deenergized by the actuation of relay R and the opening of back Rc. The actuation of ST closes STh energizing FR and resetting the minor counter. The apparatus may carry out a new operation to optimalize the Controlled System if it has drifted away from the point of optimum operation.

A feature of interest which has not been brought out in the discussion of FIG. 3 is the functioning of relay FF. This relay operates through front Fd, front CMD, back ST2k on the occurrence of four failures at the start of an optimalizing process to set the apparatus in state 2. Thereafter, small increments are added until G counts three success and this resets the apparatus in state 1. Thus probing at the start in a difficult situation is facilitated.

Conclusion

There is disclosed in this application a novel method and novel apparatus for optimizing the operation of a System and for maintaining this System at its optimum operation once it has been optimalized. It is to be realized that the invention disclosed herein has within its broader aspects a wide range of equivalents because within the broader aspects of this invention there may be variations both in the apparatus and in the method. For example, the modulo may be changed. Thus, in a System including three variables X, Y and Z, the modulo may, for example, be X, XY, Y, YZ, Z, XZ, instead of the modulo described in the introductory portion of this application. In addition, different status and state rules may be adopted. While there are advantages in having the status of X change during the third move and the status of Y during the fifth, both stati may be changed at different times. There may also be different state criteria.

While, then, a preferred embodiment has been disclosed herein, many modifications thereof are feasible. This invention, then, is not to be restricted except insofar as is necessitated by the spirit of the prior art.

We claim as our invention:

1. The method of operating an automatic experimenter, including a first register, a second register and a third register, to optimize the operation of a system, which method comprises recording on said first register a first magnitude with which data to be derived from said system is to be compared, said first magnitude being a quantitative evaluation of the operation of said system in a first setting, setting said system in a second setting different from said first setting, deriving data from said system and recording on said second register a second magnitude which is a quantitative evaluation of the operation of said system in said second setting, comparing said first and second magnitudes and only if said second magnitude indicates an improvement in the operation of said system over said first magnitude, recording said second magnitude on said third register, removing said first magnitude from said first register and transferring said second magnitude from said third register to said first register.

2. An automatic experimenter for optimizing the operation of a system comprising a first register on which is to be recorded a magnitude quantitatively evaluating said operation in a first setting of said system, a second register, means connected to said second register and to be connected to said system for recording on said second register, a second magnitude quantitatively evaluating said operation in a second setting of said system, a third register means comparing said first and second magnitudes, and means connected to said second and third registers and to said comparison means and responsive to said comparison means for transferring said second magnitude from said second register to said third register only when said second magnitude indicates improvement in said operation over said first magnitude.

3. An automatic experimenter for optimizing the operation of a system comprising a first register on which is to be recorded a magnitude quantitatively evaluating said operation in a first setting of said system, a second register, means connected to said second register and to be connected to said system for recording on said second register, a second magnitude quantitatively evaluating said operation in a second setting of said system, means comparing said first and second magnitudes, and means connected to said second and first registers and to said comparison means and responsive to said comparison means for transferring said second magnitude from said second register to said first register only when said second magnitude indicates improvement in said operation over said first magnitude.

4. The method of optimalizing the operation of a system, the operation of which varies in dependence upon the settings of a plurality of variable parameters which comprise setting said parameters at predetermined starting settings producing operation of said system of a predetermined initial magnitude, repeatedly adding increments to said starting settings in a repeating succession of steps which succession includes alternate steps in which increments are added to the settings of all said parameters, with a step in which an increment is added to a different one of said parameters interposed between each pair of said alternate steps, after each step comparing the magnitude of the operation following said step with the magnitude of said operation preceding the step, and setting the polarities of said increments of said parameters so as to optimalize said operation.

5. An evaluation system comprising, a first plurality of relays, a second plurality of relays, each of said relays having a coil, a plurality of front contacts and a plurality of back contacts, means connecting the coils of each of said plurality of relays to be selectively energized so that each plurality defines a magnitude in a binary number system in which an energized coil corresponds to the number 1 and an unenergized coil corresponds to the number zero, conductors for supplying a potential, a first voltage responsive means, a second voltage responsive means, a first set of networks, each network corresponding to a relay of said first plurality and a corresponding relay of said second plurality, a second set of networks, each second network, corresponding to a relay of said first plurality and a corresponding relay of said second plurality, each of said networks of said first set including in series a first front contact of the corresponding relay of said first plurality and a first back contact of the corresponding relay of said second plurality, each of said networks of said second set including a first back contact of the corresponding relay of said first plurality and a first front contact of the corresponding relay of said second plurality, a third set of networks each third network corresponding to a relay of said first plurality and a corresponding relay of said second plurality, a fourth set of networks, each fourth network corresponding to a relay of said first plurality except one of the last-named relays and a corresponding relay of said second plurality, except one of said last-named relays, each network of said third set including in series in a closed loop a third front contact of said first plurality, a third front contact of said second plurality, a third back contact of said first plurality and a third back contact of said second plurality, each network of said fourth set including in series in a closed loop a fourth front contact of said first plurality, a fourth front contact of said second plurality, a fourth back contact of said first plurality, a fourth back contact of said second plurality, means connecting the network of said third set in a first series array, means connecting the networks of said fourth set in a series array, a first supply conductor, a second supply conductor, means including said first voltage responsive means connecting said first series array to said second conductor, means including said second voltage responsive means connecting said second series array to said second conductor, means connecting a network of said first set between said first conductor and a terminal of the corresponding network of the third set, means connecting a network of said second set between said first conductor and a terminal of the corresponding network of the fourth set, and a conductor connecting the free terminal of the last of said networks in said first series array to said first conductor.

6. An evaluation system comprising a first plurality of relays, a second plurality of relays, each of said relays having a coil and a plurality of contacts, means connecting the coils of each of said pluralities to be selectively energized so that each plurality defines a magnitude in a binary number system in which a coil in a condition of energization corresponds to the number 1 and a coil in the opposite condition of energization corresponds to the number 0, evaluation means having a first response and a second response, and means connecting said evaluation means in circuit with said contacts of said relays of said first and second pluralities so that said evaluation means produces said first response if said magnitude defined by said first plurality is equal to or less than said magnitude defined by said second plurality and said second response if said magnitude defined by said first plurality is greater than said magnitude defined by said second plurality.

7. The method of optimalizing the operation of a system the operation of which varies in dependence upon the setting of at least one variable parameter which comprises setting said parameter at a first setting, registering the operation at said setting, changing said parameter by a predetermined increment, a first predetermined time interval after said change sufficient to enable said system to stabilize registering the operation of said system in said last-named setting of said parameter, and a second predetermined time interval after said last-named registering evaluating the change in said operation produced by said last-named setting.

8. Apparatus for optimalizing the operation of a system comprising a first register, means connected to said register for connecting said register to said system for recording thereon a first magnitude measuring the operation of said system in a first setting, means connected to said connecting means and responsive to said recording for introducing into said system an incremental change in said system, a second register, first timing means connected to said second register responsive to the introducing of said change for connecting said second register to said system to record thereon a second magnitude corresponding to the operation of said system following said introducing a predetermined time interval after said introducing, and second timing means responsive to said last-named recording for comparing said first and second magnitudes a predetermined time interval after said last-named recording.

9. Apparatus for optimalizing the operation of a system comprising a first register, means connected to said register for connecting said register to said system for recording thereon a first magnitude measuring the operation of said system in a first setting, means connected to said connecting means and responsive to said recording for introducing into said system an incremental change in said system, a second register, first timing means connected to said second register responsive to the introducing of said change for connecting said second register to said system to record thereon a second magnitude corresponding to the operation of said system following said introducing a predetermined time interval after said introducing, means responsive to said last-named recording for comparing said first and second magnitudes, and selectively operable means for removing said recording from said second register when said first magnitude exceeds said second magnitude and for transferring said recording on said second register to said first register when said second magnitude exceeds said first magnitude.

10. Apparatus for optimalizing the operation of a system comprising a first register, means connected to said register for connecting said register to said system for recording thereon a first magnitude measuring the operation of said system in a first setting, means connected to said connecting means and responsive to said recording for introducing into said system an incremental change in said system, a second register, first timing means connected to said second register responsive to the introducing of said change for connecting said second register to said system to record thereon a second magnitude corresponding to the operation of said system following said introducing a predetermined time interval after said introducing, means responsive to said last-named recording for comparing said first and second magnitudes, a third register, and selectively operable means connected to said comparing means operable to remove said recording from said second register when said first magnitude exceeds said second magnitude, and, when said second magnitude exceeds said first magnitude, operable to transfer said recording from said second register to said third register, to remove said recording from said first register and to transfer said recording on said third register to said first register in succession.

11. The method of optimalizing the operation of a system the operation of which is dependent on a plurality of parameters herein designated as X and Y which comprises setting said parameters at first settings $X_i$, $Y_i$ recording the magnitude of said operation at said first settings, in succession in a series of steps repeated periodically making incremental changes $\Delta X$, $\Delta Y$, in X and Y as follows: first step both $\Delta X$ and $\Delta Y$, second step only $\Delta X$, third step both $\Delta X$ and $\Delta Y$, fourth step only $\Delta Y$, after each of said steps, recording the magnitude of said operation, comparing said last-named magnitude with the highest one of the magnitudes of said operation recorded after the steps preceding said last-named step, and when said highest magnitude exceeds said last-named magnitude reverting said parameter or parameters to its or their settings prior to said last-named step and presetting the polarity or polarities of said increments so that the increment of the parameter or parameters of said last-named step will have a polarity opposite to its or their polarity for said last-named step in a succeeding step in which an increment of said last-named parameter or parameters is introduced.

12. Apparatus for optimalizing the operation of a system the operation of which is dependent on the setting of at least one variable parameter, the said apparatus comprising a first register, means connected to said register for connecting said register to said system to record on said register a first magnitude measuring the operation of said system in a first setting of said parameter, means to be connected to said system for changing said parameter by increments of a first predetermined magnitude, a second register, means connected to said second register and to said changing means and to be connected to said system for recording on said second register a second magnitude measuring the operation of said system in each setting of said parameter in which said parameter is changed by different increments from said first setting, means connected to said first and second registers for comparing the latest of said second magnitudes with the highest of the first or second magnitudes recorded prior to said latest second magnitude, means connected to said comparing means and responsive to said comparing means when said latest magnitude is smaller than the magnitude with which it is compared and after said setting has been changed by a predetermined number of increments for changing the magnitude of further increments to a second predetermined magnitude smaller than said first magnitude.

13. In apparatus for optimalizing of a system the operation of which depends on the setting of at least one variable parameter, comprising first means when actuated for adding increments of a first predetermined magnitude to said parameter in any setting thereof, second means when actuated for adding increments of a second predetermined magnitude shorter than said first magnitude to said parameter in any setting thereof, said first means being normally conditioned to be actuated, means connected to said first and second means for comparing the operation of said system in any setting of said parameter with its operation in a setting of said parameter in which an increment has been added thereto, said comparing means having a first response if the addition of said last-named increment has produced an improvement in said operation and a second response if the addition of said last-named increment has failed to produce such improvement, and means connected to said comparing means and to said first means and responsive to a second response of said comparing means for interrupting the conditioning of said first means and conditioning said second means.

14. The method of optimalizing the operation of a system the operation of which is dependent on a plurality of parameters herein designated as X and Y which comprises setting said parameters at first settings $X_1$, $Y_1$ recording the magnitude of said operation at said first settings, in succession in a series of steps repeated periodically making incremental changes $\Delta X$, $\Delta Y$ in X and Y as follows: first step both $\Delta X$ and $\Delta Y$, second step only $\Delta X$, third step both $\Delta X$ and $\Delta Y$, fourth step only $\Delta Y$, after each of said steps recording the magnitude of said operation, comparing said last-named magnitude with the highest one of the magnitudes of said opration recorded after the steps preceding said last-named step, when following any one of the first three of said steps said highest magnitude exceeds said last-named magnitude reverting said parameter or parameters to its or their settings prior to said last-named step and presetting the polarity or polarities of said increments so that the increment of the parameter or parameters of said last-named step will have a polarity opposite to its or their polarity for said last-named step in a succeeding step in which an increment of said last-named parameter or parameters is introduced, and when following steps after said third step said highest magnitude exceeds said last-named magnitude reverting said parameter or parameters to its or their settings prior to said last-named step without changing the polarity or polarities of said increment or increments.

15. The method of optimalizing the operation of a system with respect to a plurality of parameters, said parameters being set at initial magnitudes, the said method comprising during successive moves, successively adding increments of said parameters, after each move comparing the operation of said system with the highest operation during preceding moves, setting the magnitude and the polarity of the parameters added during any move in dependence upon the result of the comparison following a prior move so as to set said parameters at magnitudes at which said operation is increased, after a predetermined number of successive moves each resulting in no improvement of operation have been completed, periodically comparing the actual operating of said system with the operation following the last of said number of moves, and on the measurement of an improvement in operation during one of said comparisons repeating the aforesaid steps of said method.

16. The method of optimalizing the operation of a system with respect to a plurality of parameters, said parameters being set at initial magnitudes, the said method comprising during successive moves successively adding increments of said parameters, after each move comparing the operation of said system with the highest operation during preceding moves, setting the magnitude and the polarity of the parameters added during any move in dependence upon the result of the comparison following a prior move so as to set said parameters at magnitudes at which said operation is increased, and after a predetermined number of successive moves each resulting in no improvement of operation have been completed periodically comparing the actual operating of said system with the operation following the last of said number of moves.

17. The method of optimalizing the operation of a system with respect to a plurality of parameters on which the operation of the system is dependent, said parameters being set at a first setting, the said method comprising recording a first magnitude measuring the operation of said system with said parameters at said first setting, adding an increment to at least one of said parameters to set said parameters at a record setting, recording a second magnitude measuring the operation of said system at said second setting, comparing said first and second magnitudes, if said second magnitude is higher than said first magnitude, replacing said first magnitude by said second magnitude, adding another increment to at least one of said parameters to set said parameters a third setting, recording a third magnitude measuring the operation of said system at said third setting, and comparing said second and third magnitudes.

18. The method of optimalizing the operation of a system with respect to a plurality of parameters on which the operation of the system is dependent, said parameters being set at a first setting, the said method comprising recording a first magnitude measuring the operation of said system with said parameters at said first setting, adding an increment to at least one of said parameters to set said parameters at a record setting, recording a second magnitude measuring the operation of said system at said second setting, comparing said first and second magnitudes, if said first magnitude is higher than said second magnitude removing the record of said second magnitude, adding another increment to at least one of said parameters to set said parameters a third setting, said other increment having a polarity and/or magnitude so that said third setting changes said system in a different direction than said second setting, recording a third magnitude measuring the operation of said system at said third setting, and comparing said second and third magnitudes.

19. The method of optimalizing the operation of a system, the operation of which is dependent on a plurality of parameters, said method comprising adding increments of predetermined magnitudes to at least one of said parameters in successive moves, after each move comparing the operation of said system with the highest operation measured during prior moves, after a predetermined number of successive moves for each of which said comparison manifested no improvement preventing the further adding of increments to said parameters, and thereafter, checking the operation of said system at intervals to determine if the operation of said system has drifted.

20. The method of optimalizing the operation of a system, the operation of which is dependent on a plurality of parameters, said method comprising adding increments of predetermined lengths to at least one of said parameters in successive moves, after each move comparing the operation of said system with the highest operation measured during prior moves, after a predetermined number of successive moves for each of which said comparison manifested no improvement preventing the further adding of increments to said parameters, and thereafter, checking the operation of said system at intervals to determine if the operation of said system has drifted, the intervals between successive checkings being substantially longer than the interval between successive moves.

21. The method of optimalizing the operation of a system, the operation of which is dependent on a plurality of parameters, said method comprising adding increments of predetermined lengths to predetermined combinations of said parameters following a predetermined pattern in successive moves, said pattern being repeated, after each move comparing the operation of said system with the highest operation measured during prior moves, after a predetermined number of successive moves for each of which said comparison manifested no improvement preventing the further adding of increments to said parameters, and thereafter, checking the operation of said system at intervals to determine if the operation of said system has drifted.

22. An automatic experimenter for optimalizing the operation of a system comprising a first register on which is to be recorded a first magnitude quantitatively evaluating said operation in a first setting of said system, a second register, means connected to said second register and and to be connected to said system for recording on said second register a second magnitude quantitatively evaluating said operation in a second setting of said system, means comparing said first and second magnitudes, and means connected to said comparing means and to said registers for erasing said second magnitude from said second register if said comparing indicates that said second setting produces no improvement in said operation over said first setting and for erasing said first magnitude from said first register and transferring to said first register from said second register said second magnitude if said comparing indicates that said second setting produces an improvement in said operation in said first setting.

23. Apparatus for optimalizing the operation of a system comprising a first register, means connected to said register for connecting said register to said system for recording thereon a first magnitude measuring the operation of said system in a first setting, means connected to said connecting means and responsive to said recording for introducing into said system an incremental change in said system, a second register, first timing means connected to said second register responsive to the introduction of said change for connecting said second register to said system to record thereon a second magnitude corresponding to the operation of said system following said introduction a predetermined time interval after said introduction, and means responsive to said last-named recording for comparing said first and second magnitudes, said interval being of such duration that said system stabilizes before said interval times out.

24. In apparatus for optimalizing the operation of a system the operation of which is dependent on the setting of a plurality of variable parameters and in which increments of said parameters in various combinations are added successively to the corresponding parameters, a relay means corresponding to each said combination, means connecting said relay means in a circuit in which said relay means are one at a time actuable to be set in increment-combination-adding condition in a succession corresponding to the succession in which said increment combinations are added to said parameters, means responsive to a relay means at any time in increment-combination-adding condition for adding to said parameters the corresponding increment combination, and means responsive to the addition of said last-named increment combination for setting the relay means corresponding to the next in said succession of said increment combination in increment-combination adding conditions.

25. An evaluation system for evaluating the operation of apparatus at one time for an improvement or no improvement over operations at an earlier time comprising a first plurality of relays, a second plurality of relays, each of said relays having a coil and a plurality of contacts, means connecting the coils of each of said pluralities to be selectively energized so that each plurality defines a magnitude in a binary number system in which a coil in a condition of energization corresponds to the number 1 and a coil in the opposite condition of energization corresponds to the number 0, the number corresponding to one of said pluralities being a measure of the operation of said system at said one time and the number corresponding to the other of said pluralities being a measure of the operation of said system at said earlier time, evaluation means having a first response and a second response, and means connecting said evaluation means in circuit with said contacts of said relays of said first and second pluralities so that said evaluation means produces said first response if the magnitude defined by said first and second pluralities indicates no improvement in the operation of said apparatus and a second response of said magnitudes indicate an improvement in the operation of said apparatus.

References Cited in the file of this patent

UNITED STATES PATENTS

| | | |
|---|---|---|
| 2,122,710 | Bidwell | July 5, 1938 |
| 2,479,681 | Handley | Aug. 23, 1949 |
| 2,666,584 | Kliever | Jan. 8, 1954 |
| 2,753,503 | Wideroe | July 3, 1956 |
| 2,842,108 | Sanders | July 8, 1958 |
| 2,949,228 | Bailey et al. | Aug. 16, 1960 |

OTHER REFERENCES

"Principles of Optimalizing Control Systems and an Application to the Internal Combustion Engine," by Draper and Li, published by the American Society of Mechanical Engineers, New York, N.Y.

"The Quari Optimal Controller," from Instruments and Automation, vol. 29, pp. 2212–2216, November 1956.

UNITED STATES PATENT OFFICE
CERTIFICATE OF CORRECTION

Patent No. 3,044,701                      July 17, 1962

Albert Kerstukos et al.

It is hereby certified that error appears in the above numbered patent requiring correction and that the said Letters Patent should read as corrected below.

Column 28, lines 1 and 18, for "record", each occurrence, read -- second --.

Signed and sealed this 1st day of January 1963.

(SEAL)
Attest:

ERNEST W. SWIDER
Attesting Officer

DAVID L. LADD
Commissioner of Patents